US012011852B2

(12) United States Patent
Geyer et al.

(10) Patent No.: US 12,011,852 B2
(45) Date of Patent: Jun. 18, 2024

(54) WASHERS FOR ROTATABLE CUTTING TOOLS

(71) Applicant: Kennametal Inc., Latrobe, PA (US)

(72) Inventors: James R. Geyer, Manns Choice, PA (US); Arkadiusz Dlugosz, Osiedle Sikorskiego (PL); Thomas J. Long, II, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 57 days.

(21) Appl. No.: 17/676,570

(22) Filed: Feb. 21, 2022

(65) Prior Publication Data

US 2023/0264388 A1 Aug. 24, 2023

(51) Int. Cl.
*B28D 1/18* (2006.01)
*E21C 35/18* (2006.01)

(52) U.S. Cl.
CPC .............. *B28D 1/186* (2013.01); *E21C 35/18* (2013.01)

(58) Field of Classification Search
CPC ................................ E21C 35/18; B28D 1/186
See application file for complete search history.

(56) References Cited

U.S. PATENT DOCUMENTS 3,069,919 A 12/1962 Schultz, Jr.
4,292,876 A 10/1981 De Graan
D268,566 S 4/1983 Frieberg
D285,109 S 8/1986 Jornhagen
D285,247 S 8/1986 Jornhagen
4,932,723 A * 6/1990 Mills ..................... E21C 35/183 299/106
5,755,545 A 5/1998 Banks
D410,869 S 6/1999 Singer
6,113,195 A * 9/2000 Mercier .................. E21C 35/18 299/106
6,231,063 B1 5/2001 Chi
6,619,757 B1 9/2003 Kammerer
(Continued)

FOREIGN PATENT DOCUMENTS

EP 0413917 A1 * 2/1991
RU 2123594 C1 12/1998
(Continued)

OTHER PUBLICATIONS

Nov. 27, 2023 Notice of Allowance for U.S. Appl. No. 29/827,594, 2 Pages.

(Continued)

*Primary Examiner* — Janine M Kreck
(74) *Attorney, Agent, or Firm* — Christopher J. Owens

(57) ABSTRACT

The present invention provides rotatable cutting tools having washers with changing thicknesses. One side of the washer has a tapered surface that increases the thickness of the washer from the inner radius towards the outer radius, resulting in a thicker portion at the outer edge of the washer. The rotatable cutting tool may also have a bit with a tapered surface. The tapered surface of the bit may be structured and arranged to engage with the tapered surface of the washer. The rotatable cutting tool may also include a holder such that the assembled rotatable cutting tool includes the washer between the bit and the holder with the bit inserted into the holder and washer.

18 Claims, 25 Drawing Sheets

(56) References Cited

U.S. PATENT DOCUMENTS

| | | | | |
|---|---|---|---|---|
| 6,644,755 | B1 | 11/2003 | Kammerer | |
| 6,709,065 | B2 | 3/2004 | Peay et al. | |
| 6,824,225 | B2 | 11/2004 | Stiffler | |
| D517,404 | S | 3/2006 | Schluter | |
| D549,091 | S | 8/2007 | McIntyre et al. | |
| 7,850,250 | B1 * | 12/2010 | Sollami | E21C 35/18 299/110 |
| D634,248 | S | 3/2011 | Chen | |
| 7,896,380 | B2 | 3/2011 | Tange | |
| D644,921 | S | 9/2011 | Hsu et al. | |
| D645,337 | S | 9/2011 | Hsu et al. | |
| D654,348 | S | 2/2012 | Musselman | |
| D663,243 | S | 7/2012 | Li | |
| D710,191 | S | 8/2014 | Yamazaki | |
| D719,959 | S | 12/2014 | Vogel | |
| 9,234,424 | B1 | 1/2016 | Lehnert et al. | |
| D821,863 | S | 7/2018 | Garcia Blanco | |
| 10,260,341 | B2 | 4/2019 | Kammerer et al. | |
| 10,662,770 | B2 | 5/2020 | Kammerer et al. | |
| 2002/0175555 | A1 | 11/2002 | Mercier | |
| 2003/0047985 | A1 | 3/2003 | Stiffler | |
| 2003/0141753 | A1 | 7/2003 | Peay et al. | |
| 2004/0004389 | A1 * | 1/2004 | Latham | E21C 35/18 299/107 |
| 2004/0060723 | A1 | 4/2004 | Pallapothu | |
| 2004/0084099 | A1 | 5/2004 | Miura | |
| 2005/0082899 | A1 | 4/2005 | Levankovsky | |
| 2007/0257545 | A1 | 11/2007 | Mouthaan et al. | |
| 2008/0012419 | A1 | 1/2008 | Holl | |
| 2009/0019679 | A1 | 1/2009 | Hahn et al. | |
| 2012/0326488 | A1 | 12/2012 | Lehnert et al. | |
| 2016/0298454 | A1 * | 10/2016 | Frederick | E21C 35/18 |
| 2017/0030191 | A1 | 2/2017 | Kammerer et al. | |
| 2018/0073359 | A1 | 3/2018 | Kraemer et al. | |
| 2019/0195069 | A1 | 6/2019 | Kammerer et al. | |
| 2021/0115792 | A1 | 4/2021 | Friederichs et al. | |

FOREIGN PATENT DOCUMENTS

| | | | |
|---|---|---|---|
| WO | 2011016765 | A1 | 2/2011 |
| WO | 2019201535 | A1 | 10/2019 |

OTHER PUBLICATIONS

Oct. 3, 2023 Notice of Allowance for U.S. Appl. No. 29/827,594, 7 Pages.

* cited by examiner

WASHERS FOR ROTATABLE CUTTING TOOLS

FIELD OF THE INVENTION

The present invention relates to rotatable cutting tools, and more particularly washers and bits for rotatable cutting tools.

BACKGROUND INFORMATION

Rotatable cutting tools are used in a variety of applications and are often used in road milling operations. The rotatable cutting tools often include a bit, a washer, and a retainer. The washer separates the bit from the holder and aids in preventing debris from entering the holder and wear of the front surface of the holder. As the tool is operated, the washer often becomes worn, due to the load the bit puts on the washer surface as well as pieces of debris rubbing against the washer surface. Over time, the outer edge of these washers can become very thin, resulting in an almost razor-sharp edge on the washers. This thinning of the washer requires that the washer be changed out for road milling tools with long life bits.

Increasing the thickness of the washer may increase the life of the washer. However, the inner portion of the washer does not experience as much wear as the outer portion of the washer. Therefore, providing uniform increased thickness can result in wasted resources and increased cost of the washers.

SUMMARY OF THE INVENTION

The present invention provides rotatable cutting tools having washers with changing thicknesses. One side of the washer has a tapered surface that increases the thickness of the washer from the inner radius towards the outer radius, resulting in a thicker portion at the outer edge of the washer. The rotatable cutting tool may also have a bit with a tapered surface. The tapered surface of the bit may be structured and arranged to engage with the tapered surface of the washer. The rotatable cutting tool may be inserted into a holder such that the assembled rotatable cutting tool includes the washer between the bit and the holder with the bit inserted into the holder and washer.

An aspect of the present invention is to provide a rotatable cutting tool comprising a washer and a rotatable bit. The rotatable bit comprises a bit head including a collar centered on a central longitudinal axis and a generally cylindrical shank extending rearwardly along the longitudinal axis from a rear of the collar. The washer comprises an annular flange centered around the longitudinal axis comprising an annular flange outer diameter, an annular flange inner diameter, a front face, and a rear face opposite the front face and a central hole extending through the annular flange centered around the longitudinal axis and comprising a central hole outer diameter. The rear face comprises a rear face surface substantially perpendicular to the longitudinal axis, and the front face comprises a tapered front surface arranged at a slant angle measured from a direction perpendicular to the longitudinal axis such that the annular flange comprises an inner washer thickness $T_I$, and an outer washer thickness $T_O$ radially outward from the inner washer thickness wherein the outer washer thickness $T_O$ is greater than the inner washer thickness $T_I$.

Another aspect of the present invention is to provide a cutting tool washer for use with a cutting tool bit. The washer comprises an annular flange centered around the longitudinal axis comprising an annular flange outer diameter, an annular flange inner diameter, a front face, and a rear face opposite the front face and a central hole extending through the annular flange centered around the longitudinal axis and comprising a central hole outer diameter. The rear face comprises a rear face surface substantially perpendicular to the longitudinal axis, and the front face comprises a tapered front surface arranged at a slant angle measured from a direction perpendicular to the longitudinal axis such that the annular flange comprises an inner washer thickness $T_I$, and an outer washer thickness $T_O$ radially outward from the inner washer thickness wherein the outer washer thickness $T_O$ is greater than the inner washer thickness $T_I$.

A further aspect of the present invention is to provide a rotatable bit comprising a bit head including a collar centered on a central longitudinal axis and a generally cylindrical shank extending rearwardly along the longitudinal axis from a rear of the collar. The rear of the collar comprises a collar conical surface tapered at a collar angle $A_C$ radially inward and rearwardly from an outer diameter of the collar.

These and other aspects of the present invention will be more apparent from the following description.

DETAILED DESCRIPTION

The rotatable cutting tools of the present invention address the issues mentioned above by providing a washer with an increasing thickness. The washer thickness increases through at least a portion of the washer in the radial direction between the inner diameter of the washer and the outer diameter of the washer. The washer may include a flat surface on the rear portion of the washer and may include a tapered surface on the front portion of the washer. The front portion of the washer may engage with a bit. The rear portion of the washer may engage with a holder.

Having an increasing thickness of the washer toward the outer portion of the washer provides several benefits. This includes increased safety of personnel when changing out the rotatable cutting tool. Conventional washers typically get worn to the point that the outer edge of the washer becomes razor sharp and have to be changed out by hand. By increasing the outer thickness of the washer, the washer is able to be changed out before it becomes razor sharp, thus decreasing the chances of personnel receiving cuts to their hands while attempting to changeout the rotatable cutting tool. It also decreases the downtime of the machine as personnel will be able to change out the rotatable cutting tool quicker when they do not have to take additional precautions to avoid getting cut by sharp edges of the washers. It also reduces overall downtime for the machine when washer wear is a limiting factor in operational time of the machine. By gradually increasing the thickness of the washer, it also causes a reduction in material costs compared to a uniformly thicker washer. Because the inner portion of the washer does not experience as much wear as the outer portion of the washer, it is not necessary to have the inner portion of the washer being as thick as the outer portion.

Figure 1:
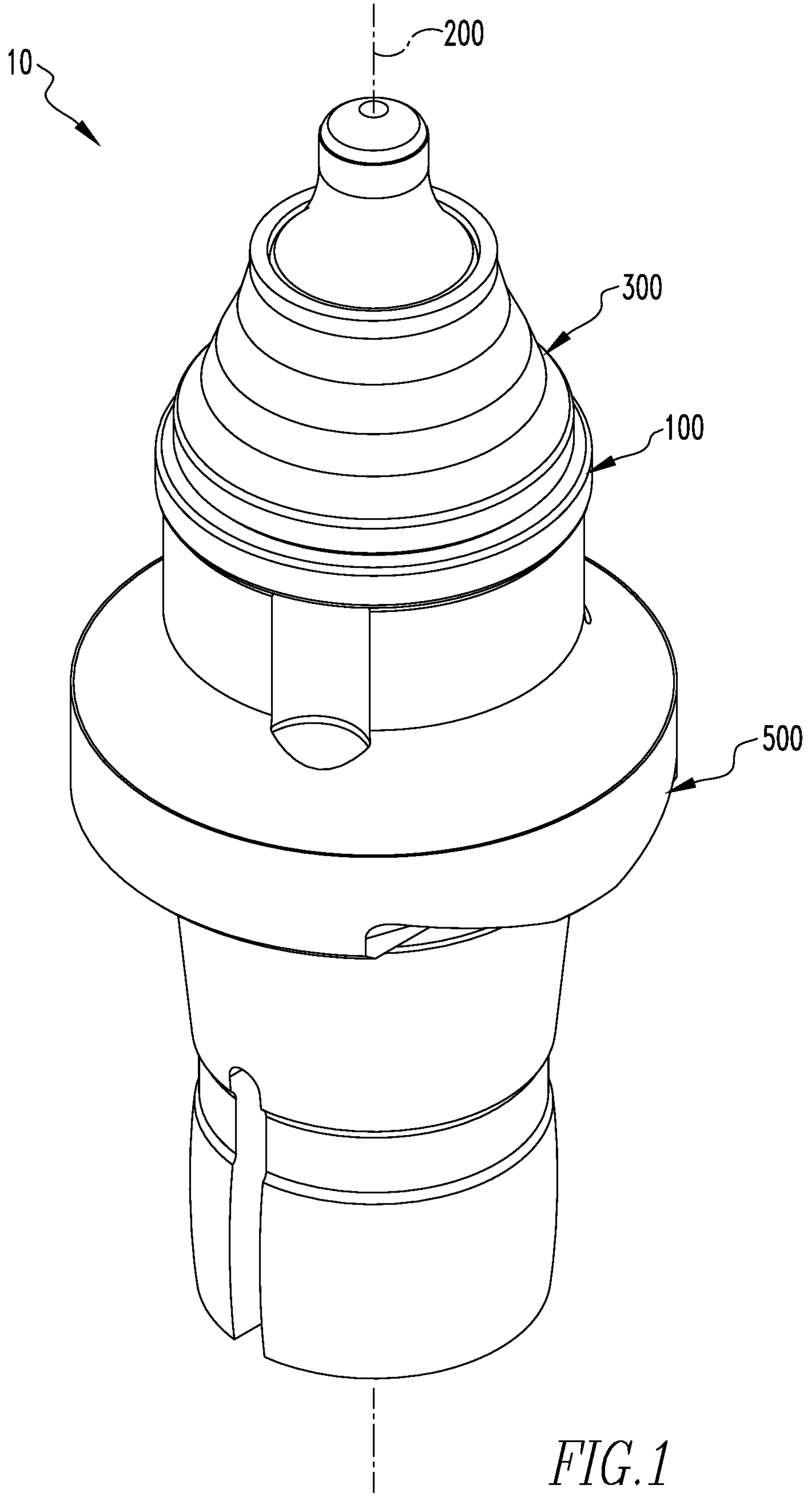
FIG. 1 is an isometric view of a rotatable cutting tool including a holder, rotatable bit and washer in accordance with an embodiment of the present invention.
Figure 2:
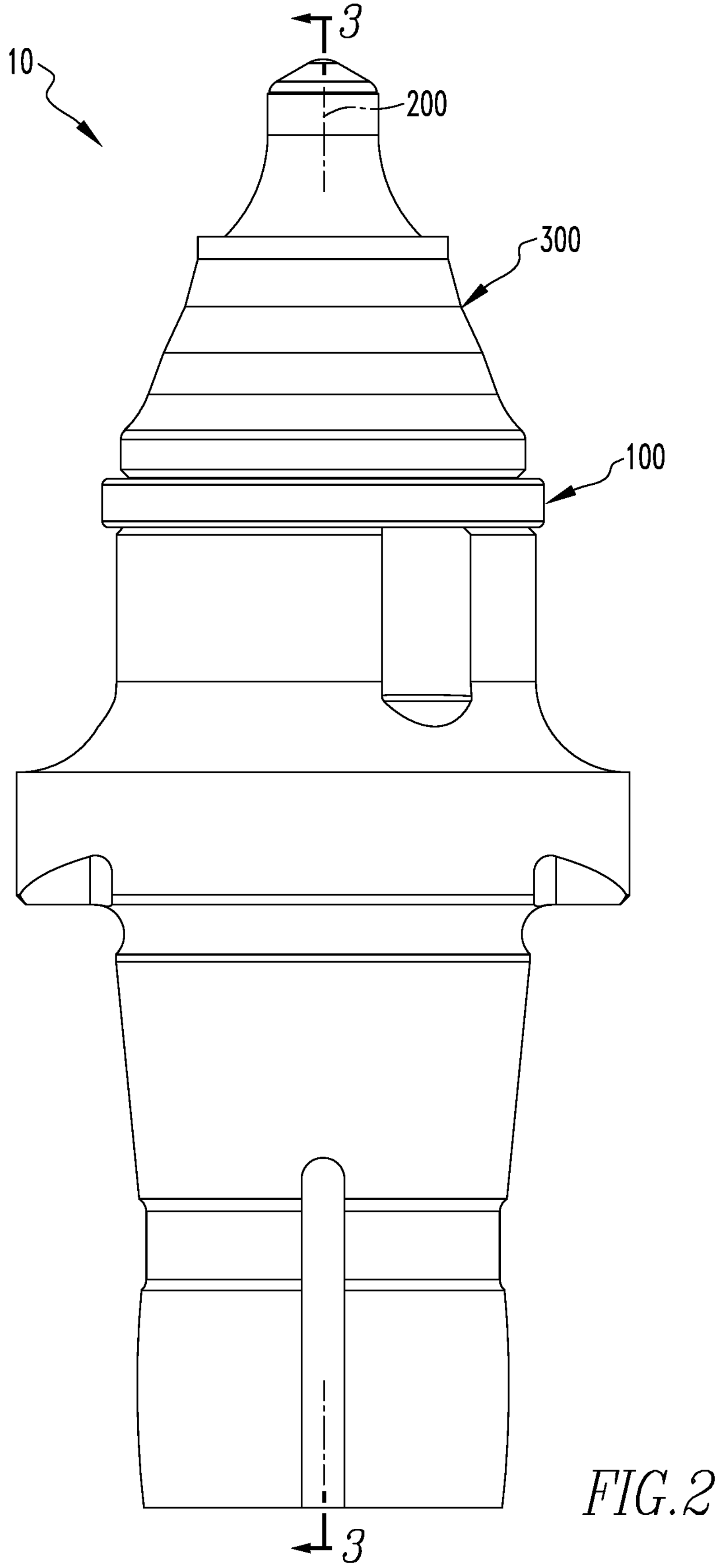
FIG. 2 is a side view of the rotatable cutting tool of FIG. 1.
Figure 3:
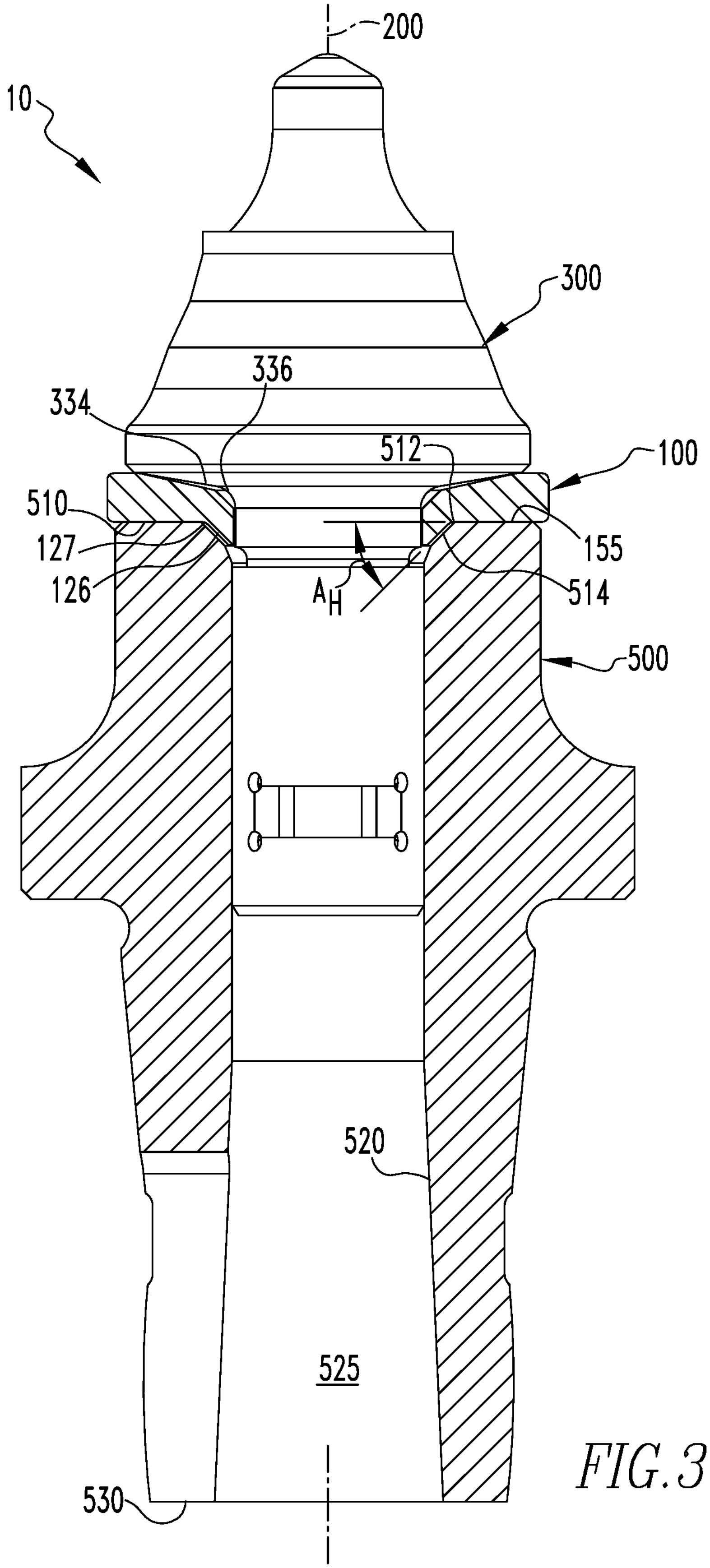
FIG. 3 is a side sectional view taken through section 3-3 of FIG. 2 showing the holder and washer in sectional form.
Figure 4:
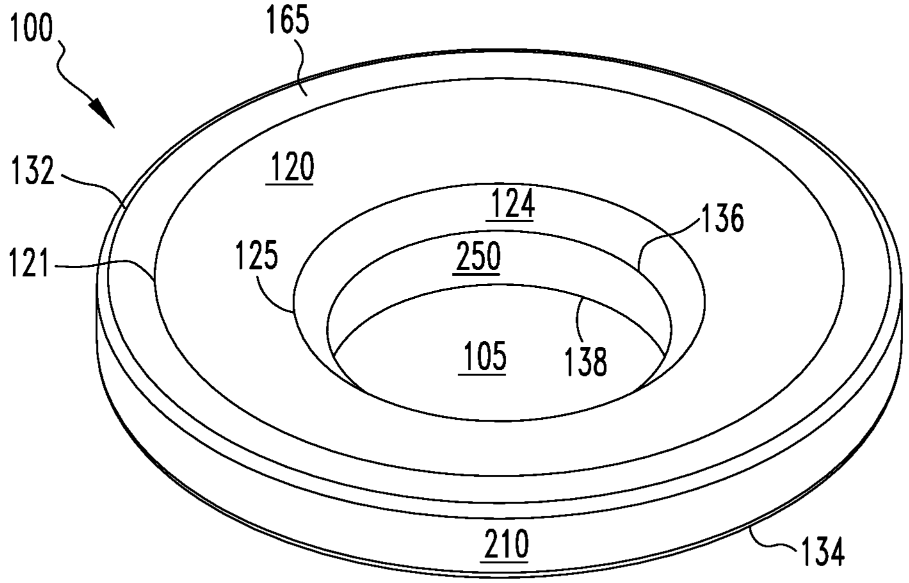
FIG. 4 is a front isometric view of a washer in accordance with an embodiment of the present invention.
Figure 5:
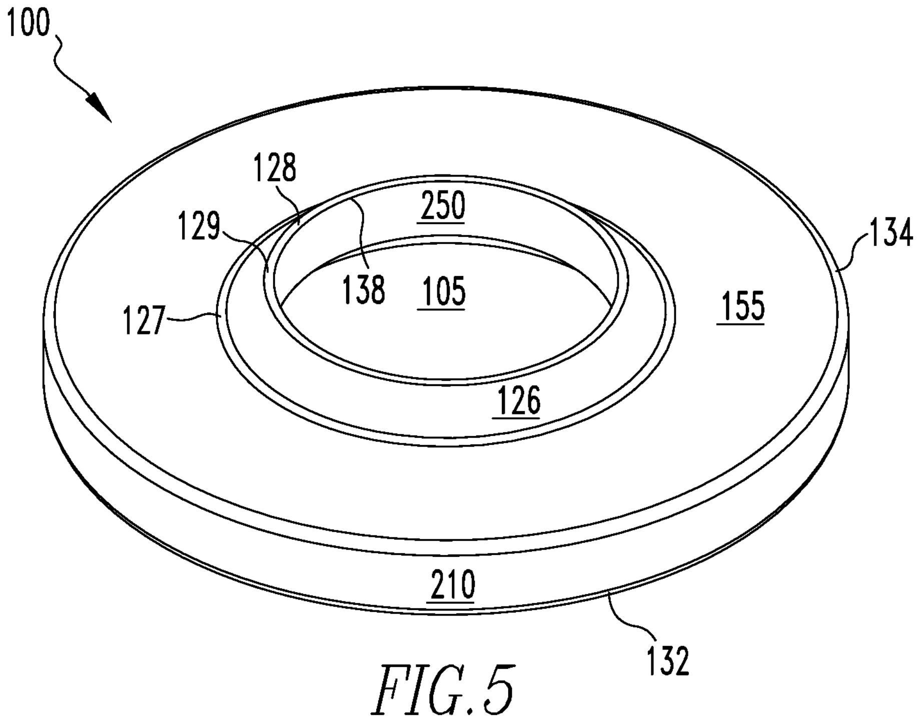
FIG. 5 is a rear isometric view of the washer of FIG. 4.
Figure 6:
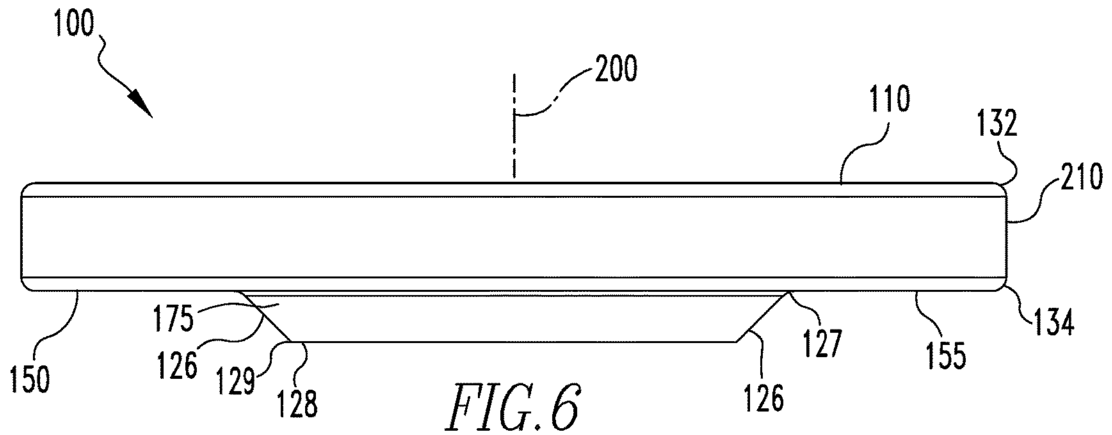
FIG. 6 is a side view of the washer of FIG. 4.
Figure 7:
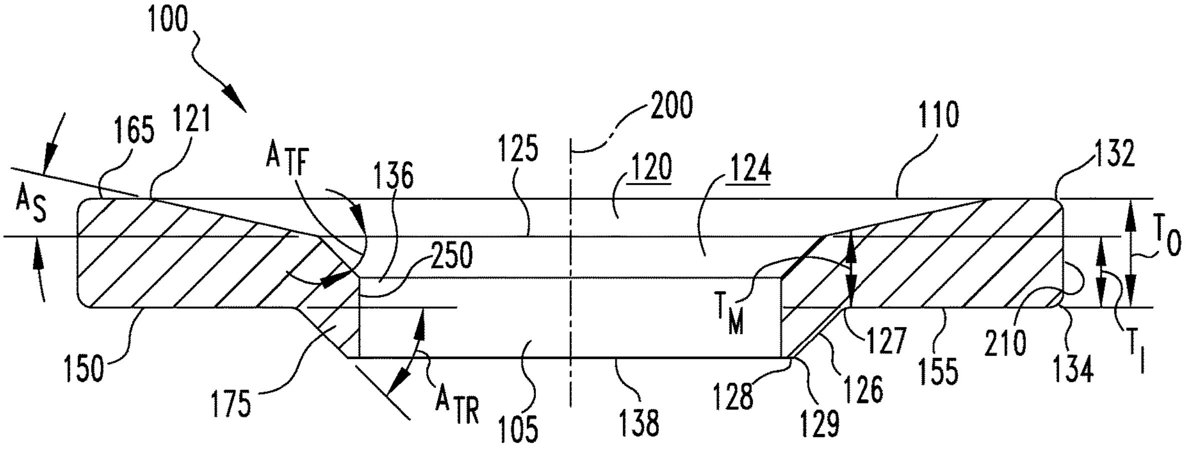
FIG. 7 is a side sectional view taken through the section 7-7 of FIG. 8.
Figure 8:
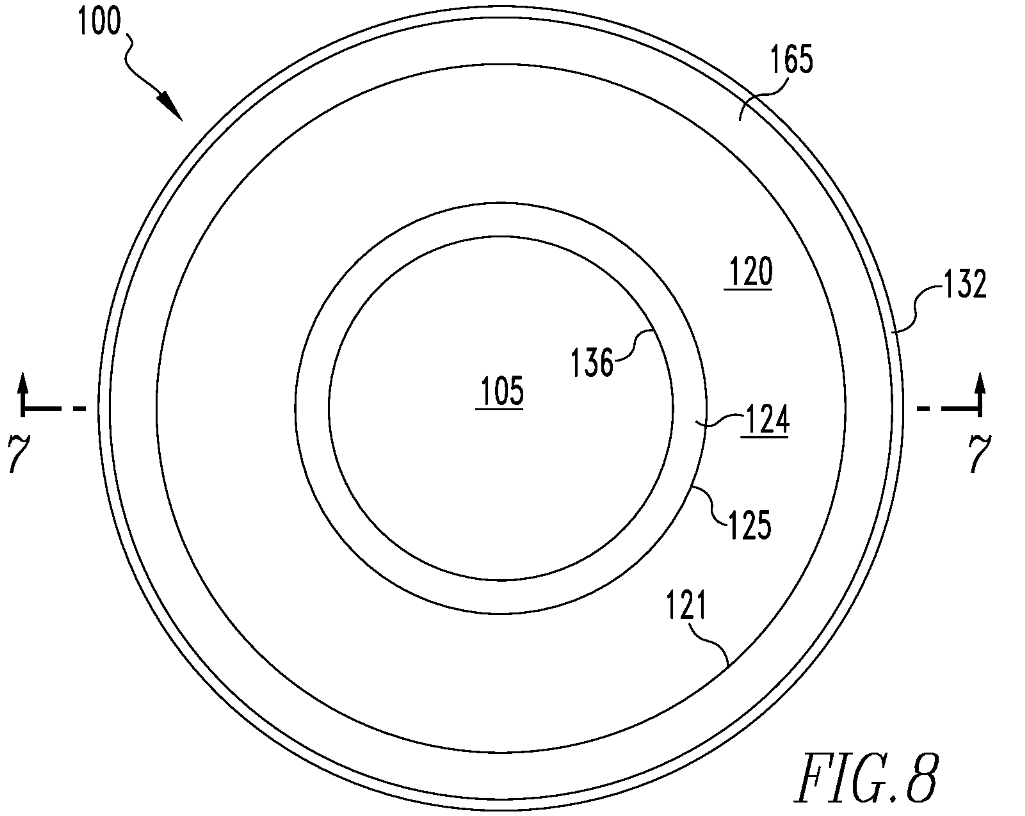
FIG. 8 is a front view of the washer of FIG. 4.
Figure 9:
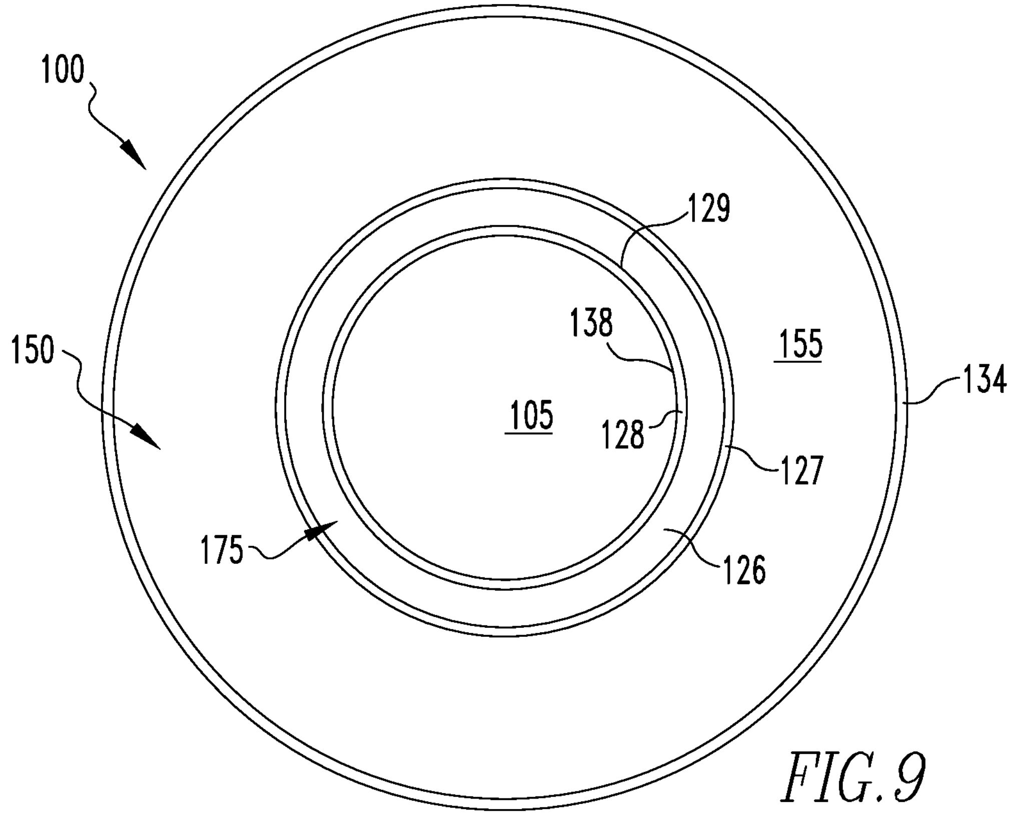
FIG. 9 is a rear view of the washer of FIG. 4.
Figure 10:
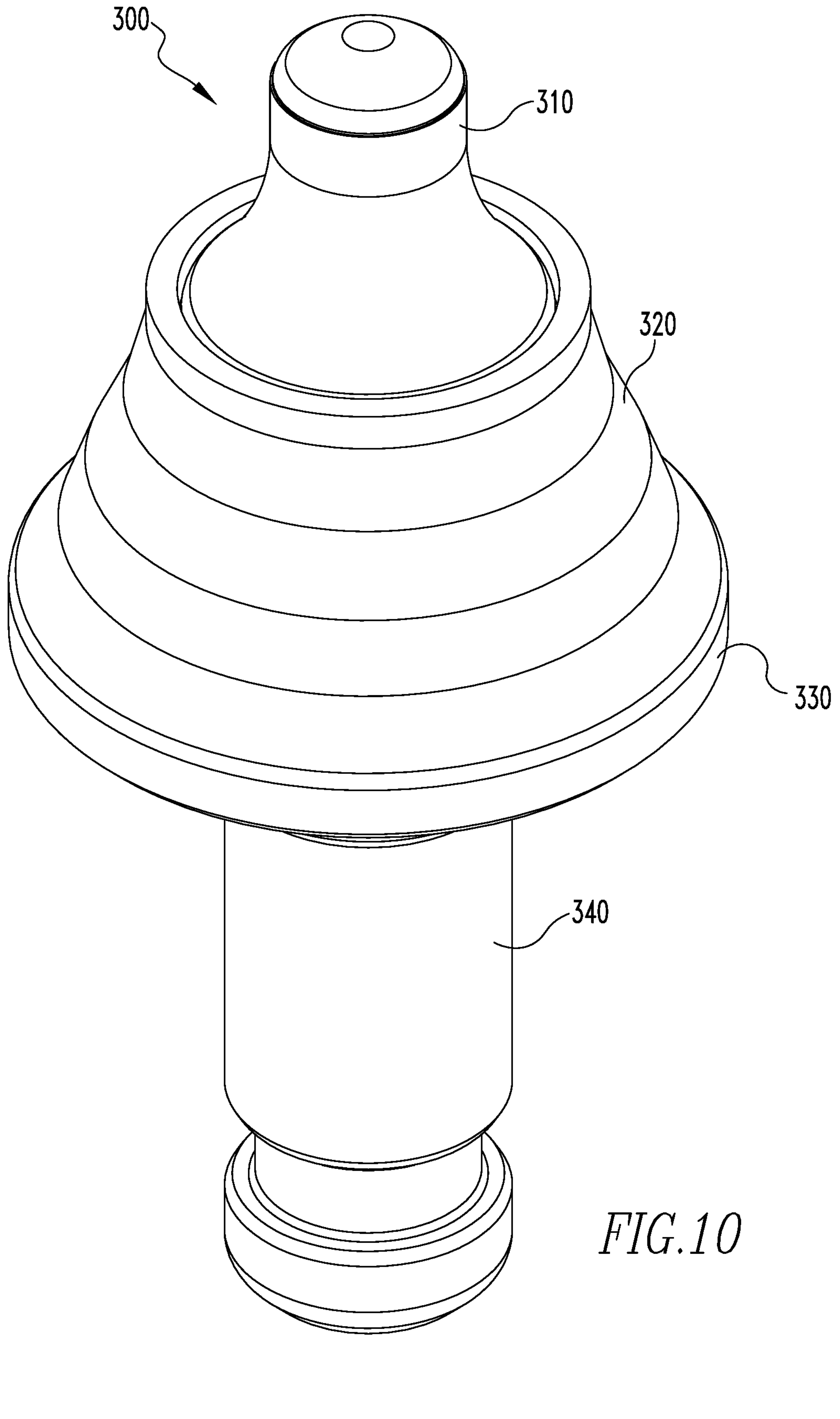
FIG. 10 is an isometric view of a bit in accordance with an embodiment of the present invention.
Figure 11:
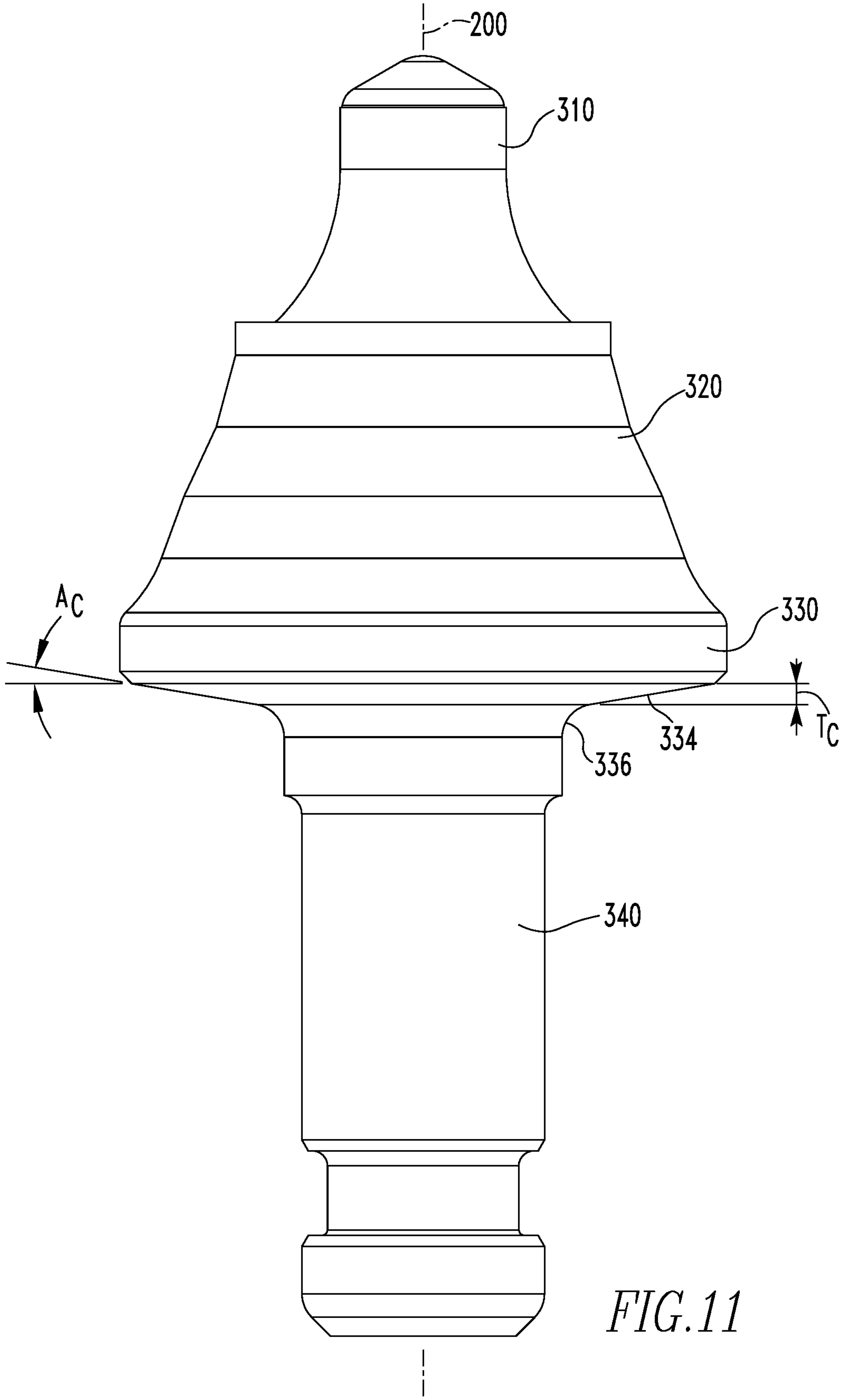
FIG. 11 is a side view of the bit of FIG. 10.

Referring to FIGS. 1-3, shown is a rotatable cutting tool 10 comprising a washer 100, a rotatable bit 300, and a holder 500. The washer 100 is located between the rotatable bit 300 and the holder 500. The washer 100 is structured and arranged to minimize wear of the holder 500 by eliminating direct contact between the holder 500 and the rotatable bit 300. The washer 100 may also be structured and arranged to reduce the amount of debris entering the holder 500 that is freed by operation of the rotatable bit 300. The rotatable cutting tool 10 may be centered around a central longitudinal axis 200 and extending in a longitudinal direction.

Referring now to FIGS. 4-9, shown is the washer 100 for the rotatable cutting tool 10. The washer 100 comprises an annular flange centered on the longitudinal axis 200 and having a washer front face 110 and a washer rear face 150. A front outer corner 132 is formed on the radially outward edge of the washer front face 110. A rear outer corner 134 is formed on the radially outward edge of the washer rear face 150. A central hole 105 may be formed in the washer 100 extending through the washer front face 110 through the washer rear face 150 along the longitudinal axis 200, forming a front inner corner 136 on the border of the washer front face 110 and the central hole 105 on the radially inward edge of the washer front face 110. The central hole 105 also forms a rear inner corner 138 on the border of the washer rear face 150 and the central hole 105 on the radially inward edge of the washer rear face 150. The central hole 105 defines the inner diameter of the washer 100.

An outer washer surface 210 may extend from the front outer corner 132 to the rear outer corner 134, defining an outer diameter of the washer 100. The outer washer surface 210 may be parallel or substantially parallel to the longitudinal axis 200. An inner washer surface 250 may extend from the front inner corner 136 to the rear inner corner 138, defining an inside diameter of the washer 100. The inner washer surface 250 may be parallel or substantially parallel to the longitudinal axis 200. In some non-limiting embodiments, the front outer corner 132, rear outer corner 134, front inner corner 136 and/or the rear inner corner 138 may be sharp edges (e.g., having two straight surfaces meeting together). In some non-limiting embodiments or aspects, the front outer corner 132, rear outer corner 134, front inner corner 136 and/or the rear inner corner 138 may be rounded edges (e.g., having a gradual transition between the meeting surfaces). In some non-limiting embodiments or aspects, the front outer corner 132, rear outer corner 134, front inner corner 136, and/or the rear inner corner 138 may be chamfered edges. The front outer corner 132, rear outer corner 134, front inner corner 136 and/or the rear inner corner 138 may be rounded to have a radius of about 0.02 inches.

With continued reference to FIGS. 4-9, in some non-limiting embodiments or aspects, the washer 100 may increase in thickness of the washer 100 between the washer front face 110 and the washer rear face 150 through at least a portion of the washer 100 in the radial direction. The increase in thickness may be caused by a surface of the washer 100, e.g., a surface of the washer front face 110, being rearwardly tapered from the washer front face 110 at an angle from perpendicular to the longitudinal axis 200. The rearwardly tapered front surface 120 may be tapered at a slant angle $A_s$. The slant angle $A_s$ may be at least 1° from being perpendicular to the longitudinal axis 200, for example, at least 2°, at least 3°, at least 4°, at least 5°, at least 7°, at least 8°, or at least 11°. The slant angle $A_s$ may be at most 30° from being perpendicular to the longitudinal axis 200, for example at most 20°, at most 18°, at most 15°, at most 14°, or at most 11°. The slant angle $A_s$ may range from 1° to 30° from being perpendicular to the longitudinal axis 200, for example, from 3° to 20°, from 5° to 18°, from 7° to 15°, or from 8° to 14°, from 8° to 11°, from 11° to 14°, or another sub range.

In some non-limiting embodiments or aspects, the slant angle $A_s$ may be constant throughout the length of the rearwardly tapered front surface 120 in the radial direction.

In some non-limiting embodiments or aspects, the slant angle $A_s$ may change through at least a portion of the rearwardly tapered front surface 120. The slant angle $A_s$ may increase and/or decrease in the radial direction along the rearwardly tapered front surface 120. The rearwardly tapered front surface 120 may be a concave or a convex surface.

The rearwardly tapered front surface 120 may result in an increasing thickness of the washer 100 in the radial direction along the rearwardly tapered front surface 120 between the washer inner surface 250 and the washer outer surface 210. In particular, the thickness may increase in the radial direction from the washer inner surface 250 to the washer outer surface 210, such that the thickness of the outer portion of the washer $T_O$ is thicker than the thickness of the inner portion of the washer $T_I$. The washer outer thickness $T_O$ may be taken as the distance between the front planar surface 165 and the washer rear surface 155 at the front outer corner 132 and the rear outer corner 134, respectively, in a direction parallel to the longitudinal axis 200. If the washer 100 does not contain a front planar surface 165, washer outer thickness $T_O$ is taken as the distance between the rearwardly tapered front surface 120 at the front outer corner 132 and the washer rear surface 155 at the rear outer corner 134 in a direction parallel to the longitudinal axis 200. The washer outer thickness $T_O$ may be the thickest portion of the washer 100. The washer outer thickness $T_O$ may be at least 0.1 inches, for example, at least 0.15 inches, at least 0.18 inches, or at least 0.19 inches. The washer outer thickness $T_O$ may be at most 0.3 inches, for example, at most 0.25 inches, at most 0.22 inches, or at most 0.21 inches. The washer outer thickness may be about 0.20 inches, but may range from 0.1 inches to 0.3 inches.

The inner washer thickness $T_I$ may be taken as the distance between the front bevel transition edge 125 and a plane parallel with the washer rear surface 155 in a direction parallel with the longitudinal axis 200. The inner washer thickness $T_I$ may be at least 0.05 inches, for example at least 0.1 inches or at least 0.12 inches. The inner washer thickness $T_I$ may be at most 0.3 inches, for example at most 0.2 inches, at most 0.175 inches or at most 0.15 inches. The inner washer thickness $T_I$ may be about 0.13 inches.

The washer outer thickness $T_O$ may be at least 1% thicker than the inner washer thickness $T_I$, for example, at least 5% thicker, at least 10% thicker, at least 20% thicker, at least 30% thicker, at least 40% thicker, or at least 50% thicker. The washer outer thickness $T_O$ may be at most 120% thicker than the inner washer thickness $T_I$, for example, at most 100%, at most 80%, at most 70%, at most 60% thicker, at most 50% thicker, or at most 40% thicker. The outer washer thickness $T_O$ may range from 1% to 120% thicker than the inner washer thickness $T_I$, for example, from 5% to 100% thicker than the inner washer thickness $T_I$, from 10% to 80% thicker than the inner washer thickness $T_I$, from 20% to 70% thicker than the inner washer thickness $T_I$, from 30% to 60% thicker than the inner washer thickness $T_I$, from 40% to 50% thicker than the inner washer thickness $T_I$, from 45% to 55% thicker than the inner washer thickness $T_I$, or another sub range.

The washer outer thickness $T_O$ may be at most 0.40 inches thicker than the inner washer thickness $T_I$, for example, at most 0.25 inches, at most 0.22 inches greater, at most 0.2 inches greater, at most 0.17 inches greater, at most 0.15 inches greater, at most 0.13 inches greater, or at most 0.1 inches greater. The washer outer thickness $T_O$ may be at least 0.01 inches thicker than the inner washer thickness $T_I$, for example at least 0.02 inches thicker, or at least 0.05 inches thicker. The washer outer thickness $T_O$ may be about 0.07 inches thicker than the inner washer thickness $T_I$. The outer washer thickness $T_O$ may range from 0.01 inches to 0.40 inches thicker than the inner washer thickness $T_I$, for example, from 0.02 inches to 0.25 thicker than the inner washer thickness $T_I$, from 0.05 inches to 0.22 thicker than the inner washer thickness $T_I$, from 0.07 inches to 0.20 thicker than the inner washer thickness $T_I$, from 0.06 inches to 0.08 thicker than the inner washer thickness $T_I$, or another sub range The minimum thickness $T_M$ of the washer 100 may occur between the front outer corner 132 and the tapered front transition edge 121. The minimum thickness $T_M$ may occur at the radial distance aligned with the rear bevel transition edge 127. The minimum thickness $T_M$ is taken as the distance between the rear bevel transition edge 127 and the rearwardly tapered front surface 120 in a direction parallel to the longitudinal axis 200. The minimum thickness $T_M$ may be at least 0.05 inches, for example at least 0.1 inches or 0.12 inches. The minimum thickness $T_M$ may be at most 0.3 inches, for example 0.2 inches, 0.175 inches or 0.15 inches. The minimum thickness $T_M$ may be about 0.13 inches.

The washer outer thickness $T_O$ may be at least 1% thicker than the minimum thickness $T_M$ of the washer 100, for example, at least 5% thicker, at least 10% thicker, at least 20% thicker, at least 30% thicker, or at least 40% thicker. The washer outer thickness $T_O$ may be at most 80% thicker than the minimum thickness $T_M$ of the washer 100, for example, at most 60% thicker, at most 50% thicker, or at most 40% thicker. The washer outer thickness $T_O$ may be at most 0.40 inches thicker than the minimum thickness $T_M$ of the washer 100, for example, at most 0.25 inches, at most 0.22 inches greater, at most 0.2 inches greater, at most 0.17 inches greater, at most 0.15 inches greater, at most 0.13 inches greater, or at most 0.1 inches greater. The washer outer thickness $T_O$ may be at least 0.01 inches thicker than the minimum thickness $T_M$ of the washer 100, for example at least 0.02 inches thicker, or at least 0.05 inches thicker. The washer outer thickness $T_O$ may be about 0.07 inches thicker than the minimum thickness $T_M$ of the washer 100.

With continued reference to FIGS. 4-9, the washer rear face 150 may include a washer rear surface 155. The washer rear surface 155 may be perpendicular to the longitudinal axis 200 and may be located between the washer outer surface 210 and the washer inner surface 250. In some non-limiting embodiments or aspects, the washer rear surface 155 may be angled slightly off perpendicular from the longitudinal axis, e.g., −3° to 3° from perpendicular, for example less than ±3° from perpendicular, less than ±2.5° from perpendicular, less than ±2° from perpendicular, less than ±1° from perpendicular, or less than ±0.25° from perpendicular.

With continued reference to FIGS. 4-9, in some non-limiting embodiments or aspects, the end of the rearwardly tapered front surface 120 may level off to a front planar surface 165 that is substantially flat (e.g., substantially parallel to the washer rear surface 155 and/or substantially perpendicular to the longitudinal axis 200). The transition between the rearwardly tapered front surface 120 and the front planar surface 165 may occur at a tapered front transition edge 121. The tapered front transition edge 121 is circular and has a transition edge diameter less than the outer diameter defined by the outer washer surface 210. The transition edge diameter may be at least 2% less than the outer diameter, for example, at least 5% less, at least 10% less, or at least 15% less. The tapered front transition edge 121 is circular and has a transition edge diameter more than the inner diameter defined by the inner washer surface 250. The transition edge diameter may be at least 20% greater than the inner diameter, for example, at least 30% greater, at least 40% greater, at least 60% greater, or at least 80% greater.

The tapered front transition edge 121 may be a rounded edge, a sharp edge, or a chamfered edge. The front planar surface 165 may extend radially from the tapered front transition edge 121 towards the washer outer surface 210. The front planar surface 165 may extend radially from the tapered front transition edge 121 to the front outer corner 132.

In some non-limiting embodiments or aspects, the washer 100 may include a conical rearwardly extending lip 175. The conical rearwardly extending lip 175 may extend from the inner washer surface 250 in the radial direction towards the outer washer surface 210. The conical rearwardly extending lip 175 may include a front bevel 124 located on the washer front face 110, and a rear bevel 126 located on the washer rear face 150. The front bevel 124 may be rearwardly tapered in the radial direction from the outer washer surface 210 to the inner washer surface 250. The front bevel 124 may be radially inside of the rearwardly tapered front surface 120. The front bevel 124 may be tapered at a front tapered angle $A_{TF}$. The front tapered angle $A_{TF}$ may be at least 30° from perpendicular with the longitudinal axis 200, for example, at least 35° or at least 40° from perpendicular with the longitudinal axis 200. The front tapered angle $A_{TF}$ may be at most 60° from perpendicular with the longitudinal axis 200, for example at most 55° or 50° from perpendicular with the longitudinal axis 200. The front tapered angle $A_{TF}$ may be about 45°. The front taper angle $A_{TF}$ causes the front bevel 124 to be conical in shape.

The rear bevel 126 may be radially inside of the washer rear surface 155. The rear bevel 126 may be rearwardly tapered in the direction from the outer washer surface 210 to the inner washer surface 250. The rear bevel 126 may be tapered at a rear tapered angle $A_{TR}$. The rear tapered angle $A_{TR}$ may be at least 30° from perpendicular with the longitudinal axis 200, for example, at least 35° or 40° from perpendicular with the longitudinal axis 200. The rear tapered angle $A_{TR}$ may be at most 60° from perpendicular with the longitudinal axis 200, for example at most 55° or 50° from perpendicular with the longitudinal axis 200. The rear tapered angle $A_{TR}$ may be about 45°. The rear taper angle $A_{TR}$ causes the rear bevel 126 to be conical in shape.

In some embodiments or aspects, the front taper angle $A_{TF}$ of the front bevel 124 may be equal to the rear tapered angle $A_{TR}$ of the rear tapered surface 126. In some embodiments or aspects, the front tapered angle $A_{TF}$ may be at most ±30° compared to the rear tapered angle $A_{TR}$, for example, at most ±15°, at most ±10°, at most ±5°, or at most ±1°.

The rearwardly tapered front surface 120 may transition into the front bevel 124. The transition between the rearwardly tapered front surface 120 and the front bevel 124 may occur at a front bevel transition edge 125. The front bevel transition edge 125 may be a sharp edge, a rounded edge, or a chamfered edge. The washer rear surface 155 may transition into the rear bevel 126 at a rear bevel transition edge 127. The rear bevel transition edge 127 may be a sharp edge, rounded edge, or a chamfered edge. For example, the rear bevel transition edge 127 and/or the front bevel transition edge 125 may be rounded at a radius ranging from 0 inches to 0.030 inches. The diameter of the front bevel transition edge 125 centered at the longitudinal axis 200 may be smaller than, larger than, or the same as the diameter of the rear bevel edge 127 centered at the longitudinal axis 200.

The rear bevel 126 may extend to the rear inner corner 138. In some non-limiting embodiments or aspects, the rear bevel 126 may transition to a rear parallel surface 128. The transition between the rear bevel 126 and the rear parallel surface 128 may occur at the rear parallel transition edge 129. The rear parallel surface 128 may be perpendicular or substantially perpendicular to the longitudinal axis 200. The rear parallel surface 128 may be parallel or substantially parallel to the washer rear surface 155. The rear parallel transition edge 129 may be a sharp edge, a rounded edge, or a chamfered edge. The rear parallel surface 128 may extend from the real parallel transition edge 129 to the rear inner corner 138.

With continued reference to FIG. 4-9, the washer 100 may be made of a metal or any material capable of obtaining a hardness of maximum 50 HRC. The washer 100 may be coated in a rust inhibitor.

In some non-limiting embodiments or aspects, the washer 600 may not include the front planar surface 165, as illustrated in the washer 600 shown in FIGS. 18-31. Instead, the rearwardly tapered front surface 620 may extend radially from the front bevel transition edge 625 to the front outer corner 632. The washer 600 may include a central hole 605 that is the same as or similar to the central hole 105 of the washer 100 shown in FIGS. 4-9. The washer 600 may include a washer front face 610 including the rearwardly tapered front surface 620, front bevel 624, front bevel transition edge 625, front outer corner 632, and front inner corner 636. The washer front face 610 may be the same as or similar to the washer front face 110 of the washer 100 shown in FIGS. 4-9 except the washer front face 610 does not include a front planar surface 165 or slanted transition edge 121. The front bevel 624, front bevel transition edge 625, front outer corner 632, and front inner corner 636 may be the same or similar to the front bevel 124, front bevel transition edge 125, front outer corner 132, and front inner corner 136, respectively, of the washer 100 of FIGS. 4-9. The washer 600 may also include a washer rear face 650 including a washer rear surface 655, rear bevel 626, rear bevel transition edge 627, rear parallel surface 628, rear parallel transition edge 629, rear outer corner 634, rear inner corner 638, and washer rear surface 655. The washer rear surface 655, rear bevel 626, rear bevel transition edge 627, rear parallel surface 628, rear parallel transition edge 629, rear outer corner 634, rear inner corner 638, and washer rear surface 655 may be the same or similar to the washer rear surface 155, rear bevel 126, rear bevel transition edge 127, rear parallel surface 128, rear parallel transition edge 129, rear outer corner 134, rear inner corner 138, and washer rear surface 155, respectively, of the washer 100 of FIGS. 4-9. The outer washer surface 710 and inner washer surface 750 of the washer 600 may be the same or similar to the outer washer surface 210 and inner washer surface 250, respectively, of the washer 100 of FIGS. 4-9. The conical rearwardly extending lip 675 of the washer 600 may be the same or similar to the conical rearwardly extending lip 175 of the washer 100 of FIGS. 4-9. The slant angle $A_{s2}$, front taper angle $A_{TF2}$, and rear taper angle $A_{TR2}$ of the washer 600 may be the same or similar to the slant angle $A_s$, front taper angle $A_{TF}$, and rear taper angle $A_{TR}$ of the washer 100 of FIGS. 4-9. The washer outer thickness $T_{O2}$, inner washer thickness $T_{I2}$, and the minimum thickness $T_{M2}$ of the washer 600 may be the same as or similar to the washer outer thickness $T_O$, inner washer thickness $T_I$, and the minimum thickness $T_M$, respectively, of the washer 100 of FIGS. 4-9. The rotatable bit 300 and the holder 500 shown in FIGS. 18-20 and 27-31 is the same or similar to the rotatable bit 300 and holder 500, respectively, shown in FIGS. 1-3 and 10-17.

Referring now to FIGS. 10-17, provided, in non-limiting embodiments or aspects is a rotatable bit 300 for road milling. The rotatable bit 300 is rotatable and includes a tip 310 arranged at a first end of the rotatable bit 300. The tip 310 may be centered around the longitudinal axis 200. The tip 310 may be conical in shape and ends in a point. The tip 310 may be made of tungsten carbide, polycrystalline diamond, or other material structured and arranged for cutting hard materials such as asphalt.

The tip 310 is engaged with a bit head 320. The bit head 320 may be conical in shape centered around the longitudinal axis 200 and extending in the longitudinal direction such that the outer diameter of the bit head 320 widens in the longitudinal direction away from the tip 310 towards the bit collar 330.

The bit collar 330 may engage the bit head 320 and be located on the opposite end of the bit head 320 than the tip 310. The bit collar 330 may be cylindrical in shape centered around the longitudinal axis 200. The bit collar 330 includes a collar front surface 332 facing the bit head 320, and a collar rear surface 334 opposite the collar front surface 332 facing away from the bit head 320 in the longitudinal direction. The collar rear surface 334 may be slanted at a collar angle $A_C$ from perpendicular with the longitudinal axis 200, creating a conical surface. The collar angle $A_C$ may be at least 1° from being perpendicular to the longitudinal axis 200, for example, at least 2°, at least 3°, at least 4°, at least 5°, at least 6°, at least 7°, at least 8°, or at least 11°. The collar angle $A_C$ may be at most 30° from being perpendicular to the longitudinal axis 200, for example at most 20°, at most 18°, at most 15°, at most 14°, at most 11°, or at most 8°. The collar angle $A_C$ may range from 1° to 30° from being perpendicular to the longitudinal axis 200, for example, from 3° to 20°, from 5° to 18°, from 7° to 15°, or from 8° to 14°, from 8° to 11°, from 11° to 14°, from 5° to 8°, or another sub range. The collar angle $A_C$ may be parallel or substantially parallel to the slant angle $A_s$ of the rearwardly tapered front surface 120.

The collar rear surface 334 may increase in height in the radial direction from the outer diameter of the bit collar 320 towards the center of the bit collar 320. The height increase may be measured from a plane perpendicular to the longitudinal axis 200 at the outer edge of the collar rear surface 334. The change in collar height Tc may be at most 0.25 inches, for example, at most 0.22 inches, at most 0.2 inches, at most 0.17 inches, at most 0.15 inches, at most 0.13 inches, or at most 0.1 inches. The change in collar height Tc may be at least 0.01 inches, for example at least 0.02 inches, or at least 0.05 inches. The change in collar height Tc may be about 0.07 inches.

In some non-limiting embodiments or aspects, the collar angle $A_C$ of a rotatable bit 300 structured and arranged for a washer 100 with a washer front planar surface 165 may be steeper than or equal to the collar angle $A_C$ for a rotatable bit 300 structured and arranged for a washer 100 without a washer front planar surface 165, e.g., in a range from 11° to 14° with a washer front planar surface 165 or in a range from 8° to 11° without a washer front planar surface 165. The slanted collar rear surface 334 may allow for increased stability of the tool and a reduction in the possible flow of debris into the holder 500.

In some non-limiting embodiments or aspects, the collar angle $A_C$ may be at least ±1° different than the slant angle $A_s$, for example ±2°, 4°, or ±5° different than the slant angle $A_S$.

A bit shank 340 extends from the collar rear surface 334 centered around the longitudinal axis 200 extending in the longitudinal direction away from the collar rear surface 334. The bit shank 340 may be cylindrical in shape and structured and arranged to connect to a holder 500. The collar rear surface 334 may transition to the bit shank 340 through a bit transition edge 336. The bit transition edge 336 may be a rounded edge, a sharp edge, or a chamfered edge. A curved bit transition edge 336 may be conical in shape with a transition edge radius. In some non-limiting embodiments or aspects, the bit shank 340 may be surrounded by a bit retainer 342.

Figure 12:
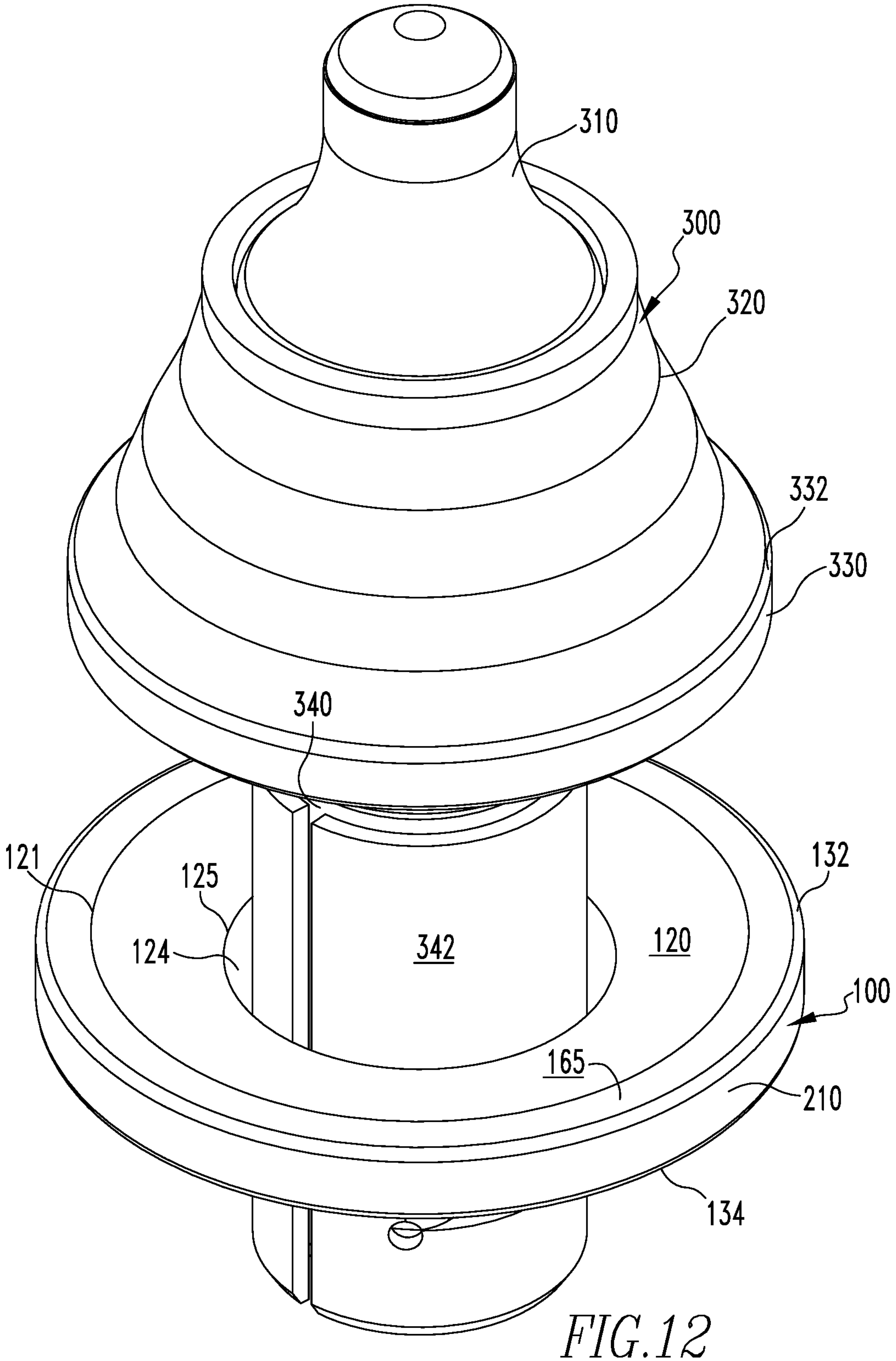
FIG. 12 is an isometric view of a bit and a washer prior to installation on a holder, with the washer at a distance from the bit collar in accordance with an embodiment of the present invention.
Figure 13:
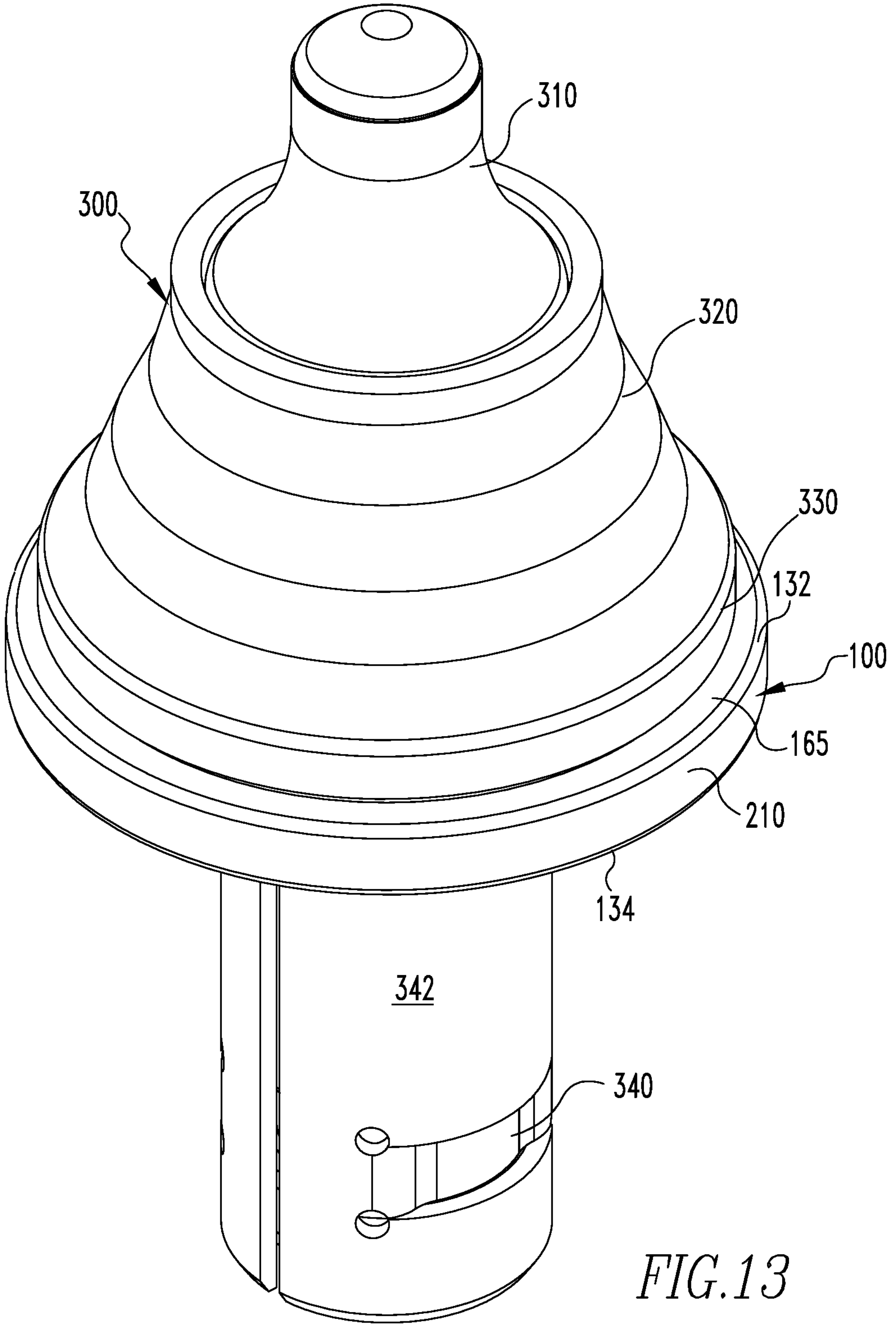
FIG. 13 is an isometric view of the bit and washer of FIG. 12, with the washer against the bit collar in accordance with an embodiment of the present invention.
Figure 14:
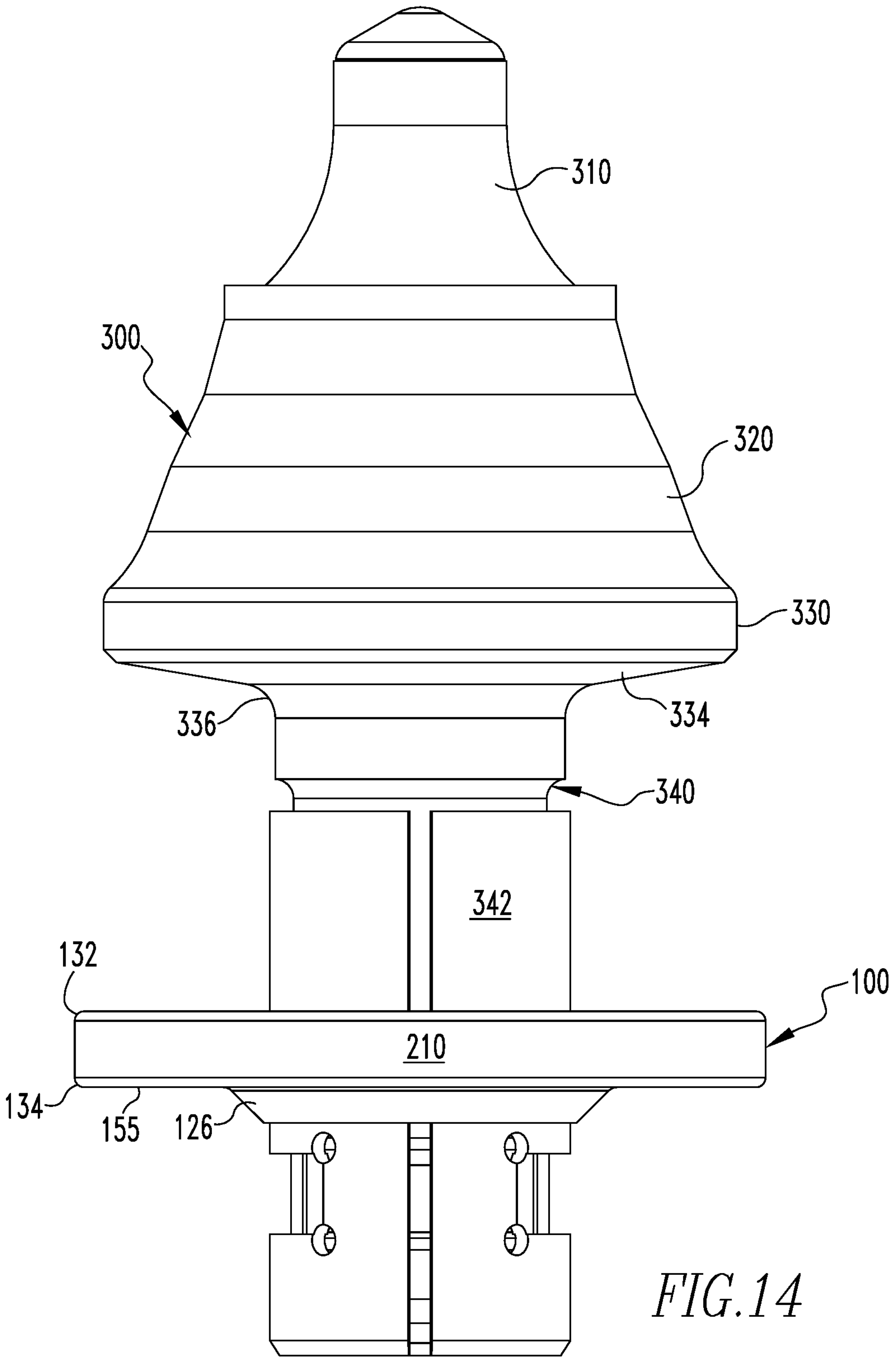
FIG. 14 is a side view of the bit and washer of FIG. 12.
Figure 15:
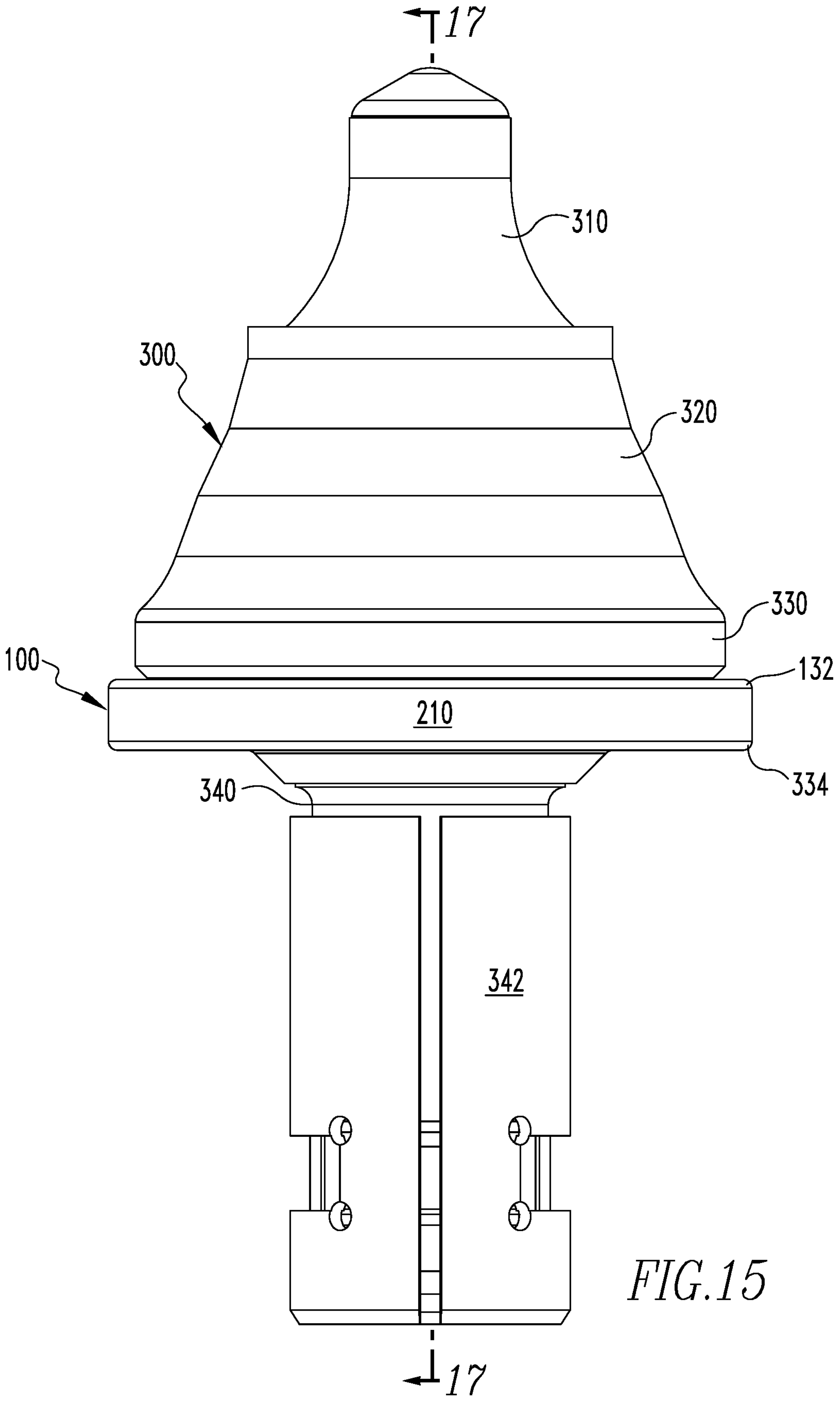
FIG. 15 is a side view of the bit and washer of FIG. 13.
Figure 16:
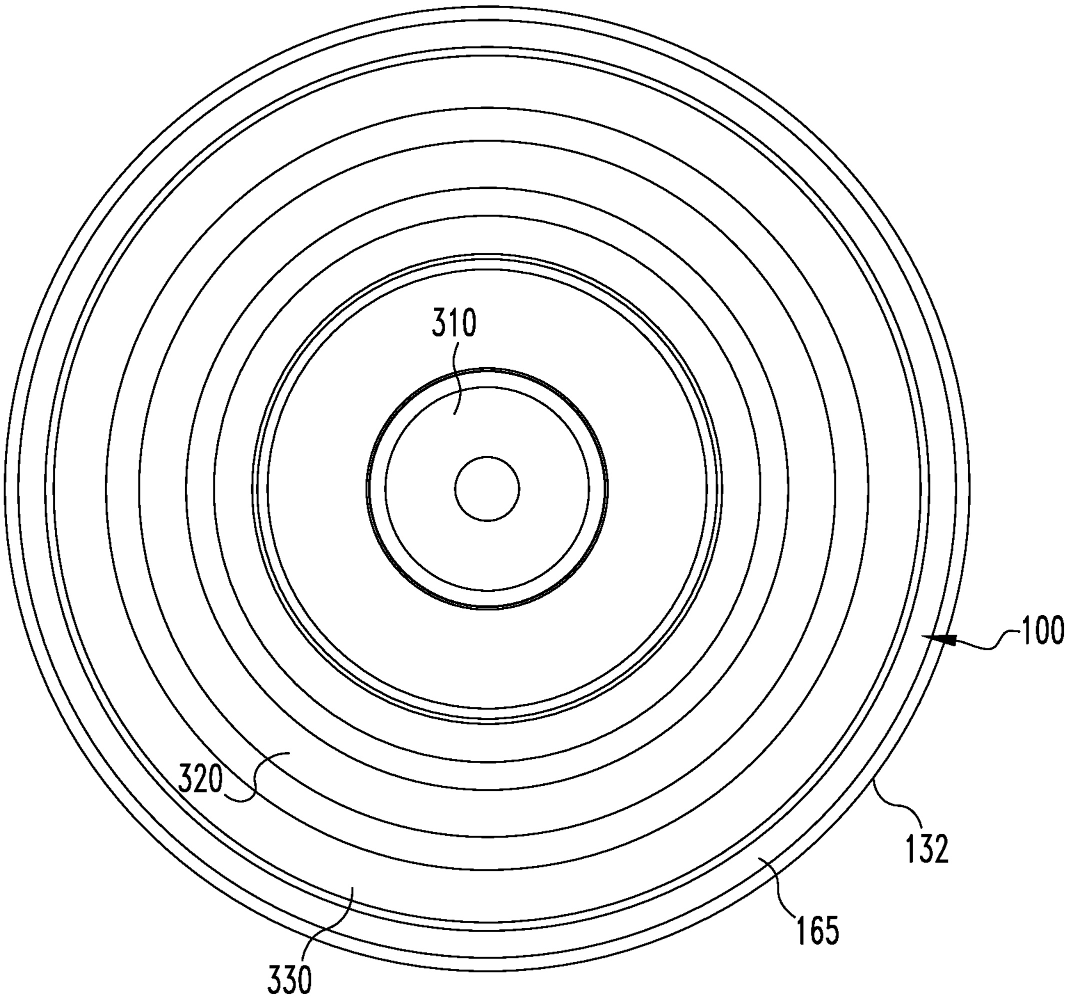
FIG. 16 is a front view of a bit and a washer in accordance with an embodiment of the present invention
Figure 17:
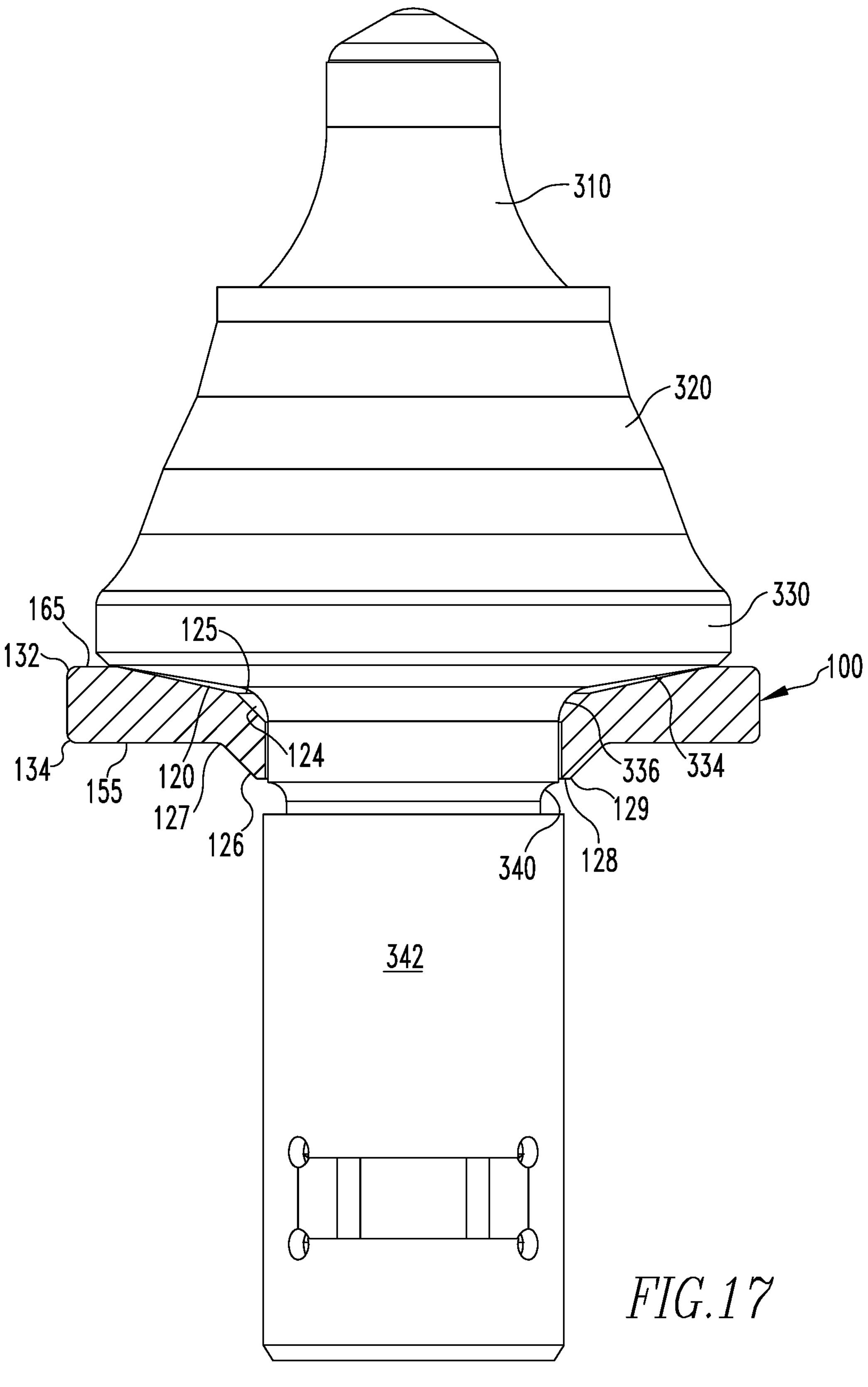
FIG. 17 is a cross-sectional side view taken through section 17-17 of FIG. 15 showing the washer in sectional form.
Figure 18:
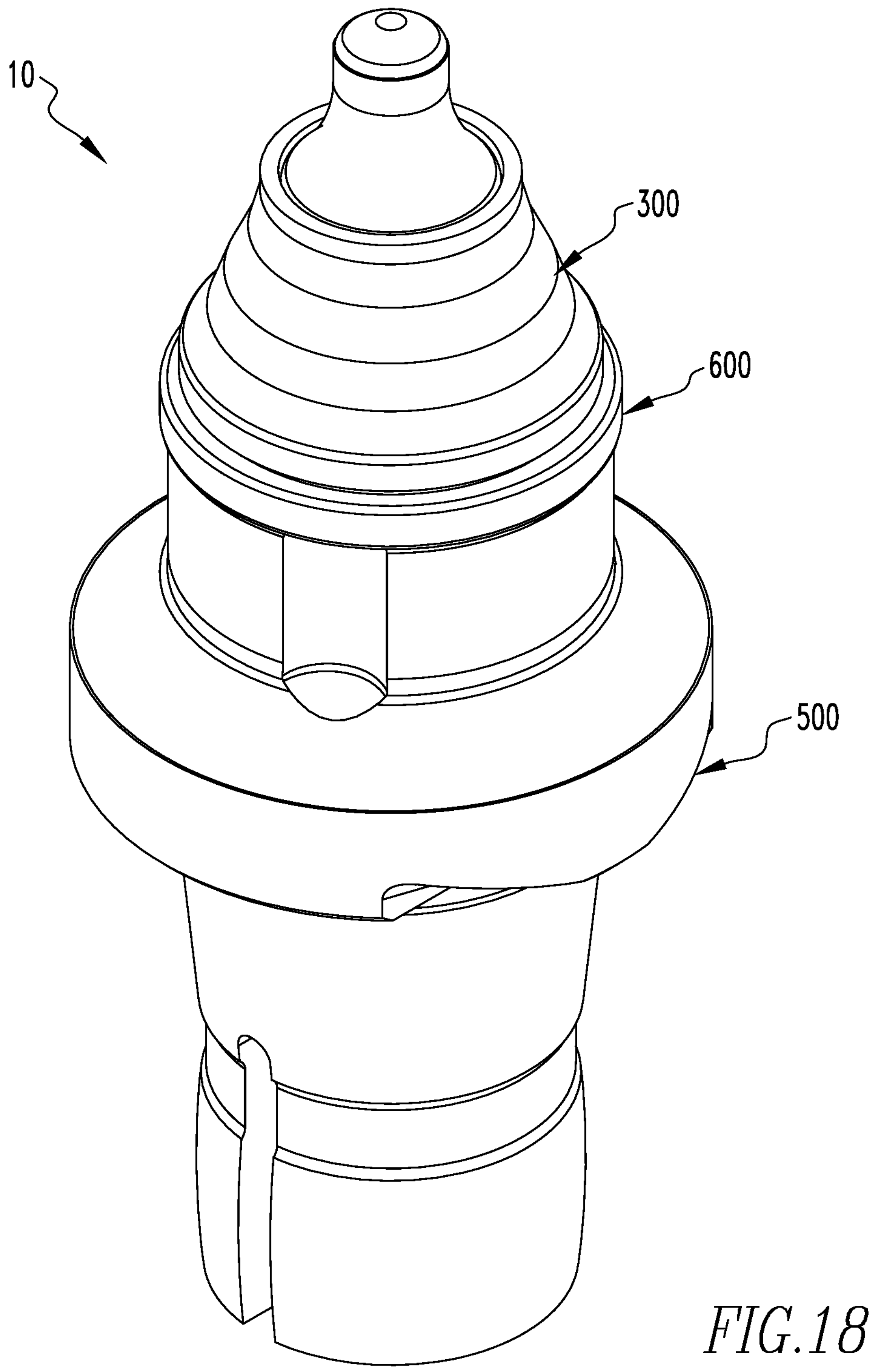
FIG. 18 is a front isometric view of a rotatable cutting tool including a holder, rotatable bit, and washer in accordance with an embodiment of the present invention.
Figure 19:
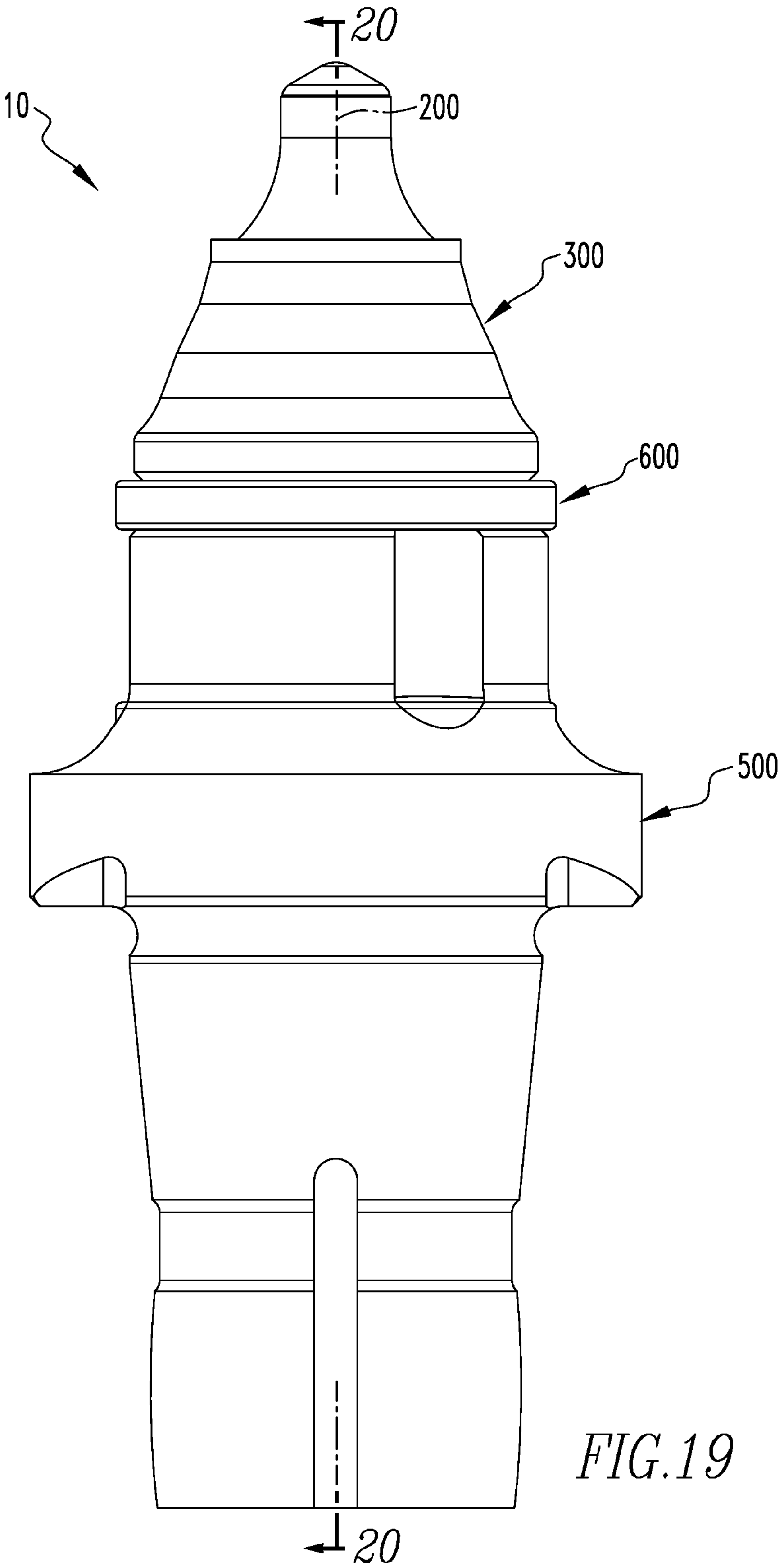
FIG. 19 is a side view of the rotatable cutting tool of FIG. 18.
Figure 20:
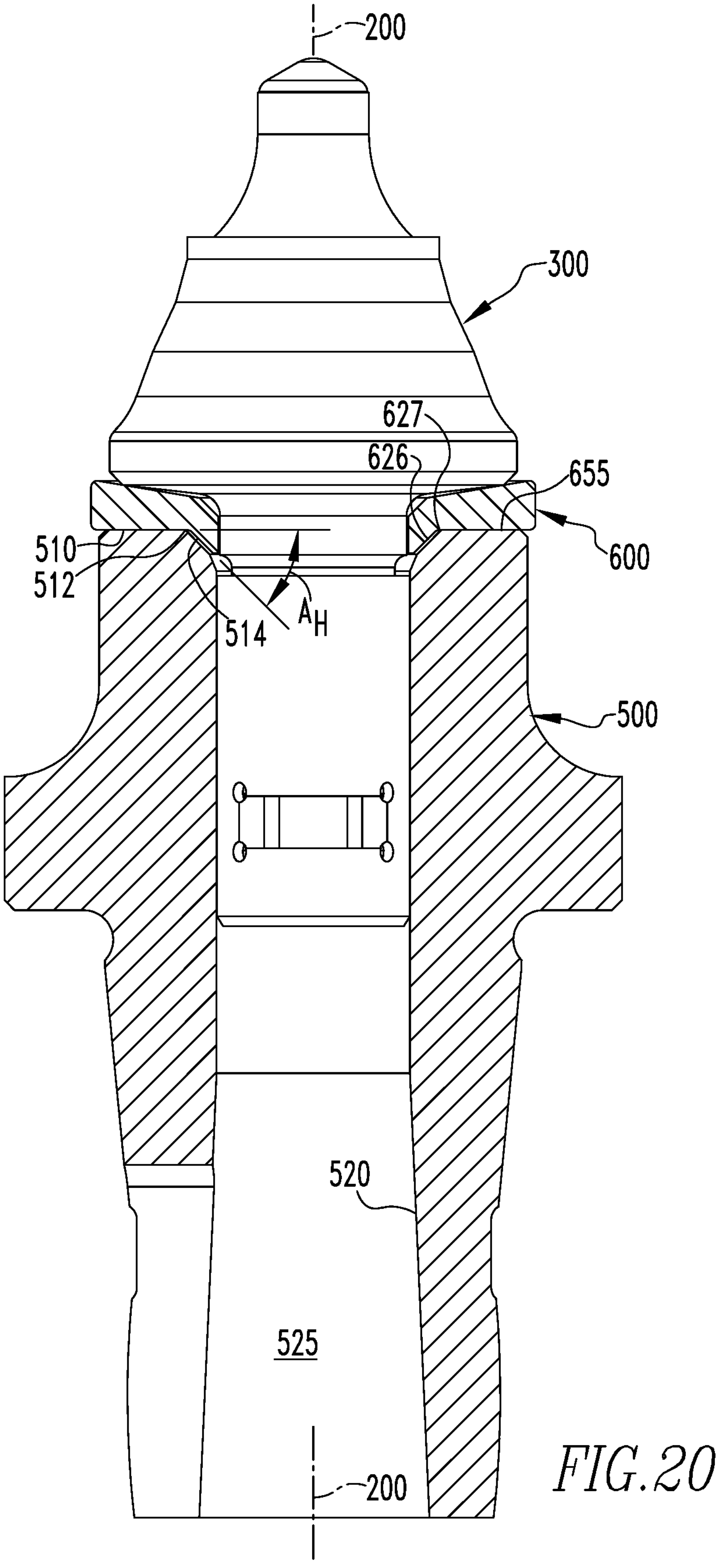
FIG. 20 is a side sectional view taken through section 20-20 of FIG. 19 showing the holder and washer in sectional form.
Figure 21:
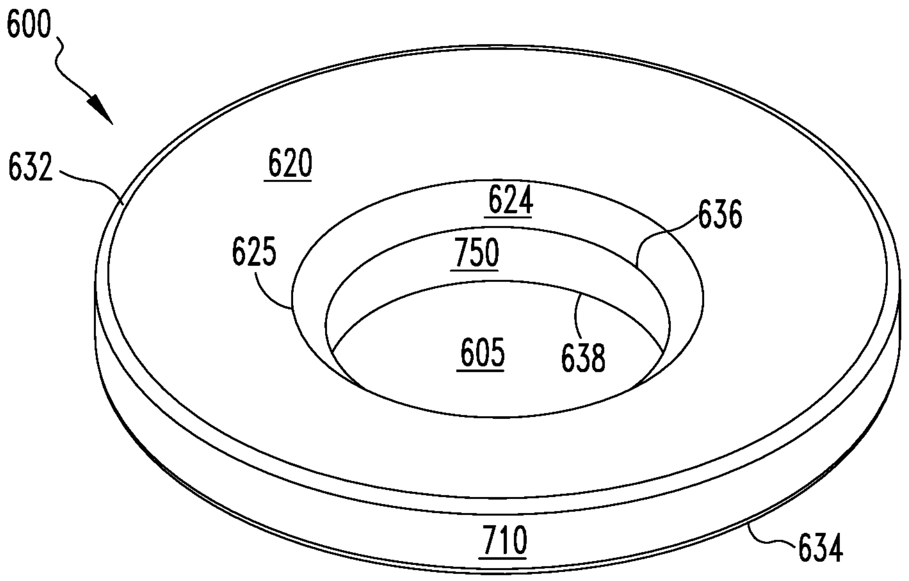
FIG. 21 is a front isometric view of a washer in accordance with an embodiment of the present invention.
Figure 22:
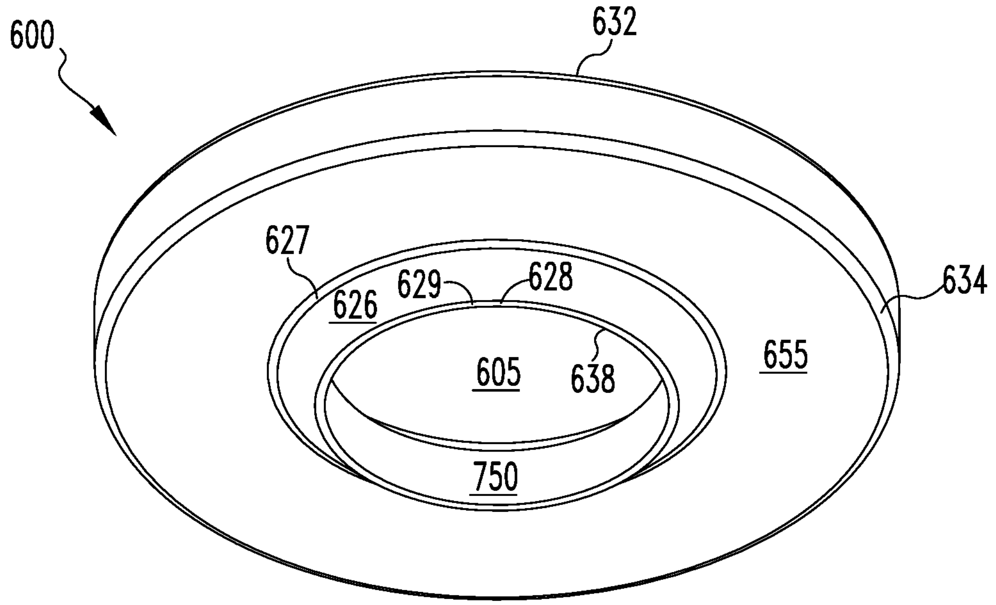
FIG. 22 is a rear isometric view of the washer of FIG. 21.
Figure 23:
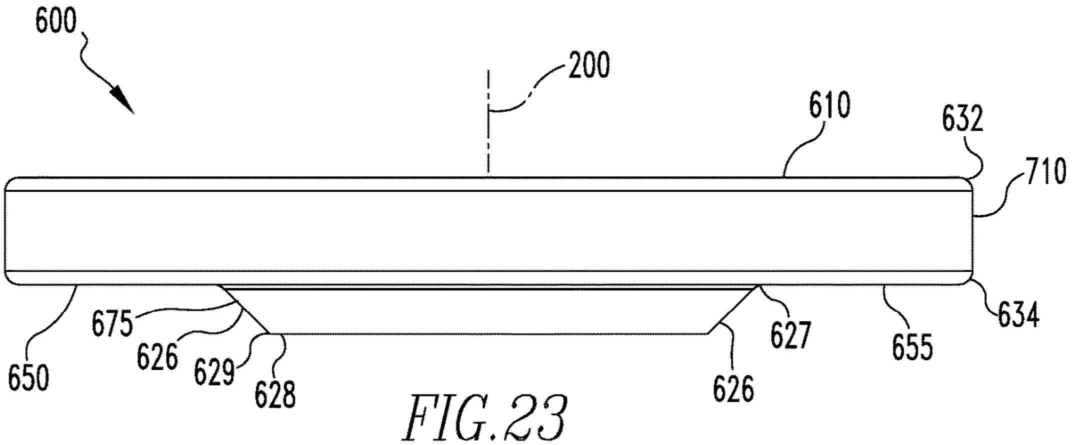
FIG. 23 is a side view of a washer in accordance with an embodiment of the present invention.
Figure 24:
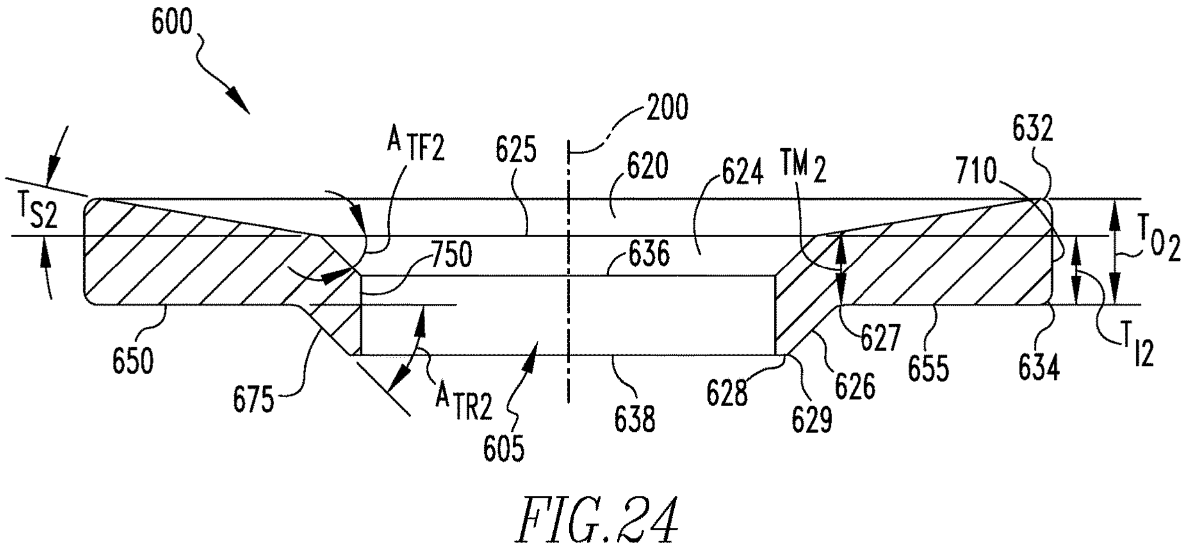
FIG. 24 is a side sectional view taken through section 24-24 of FIG. 25.
Figure 25:
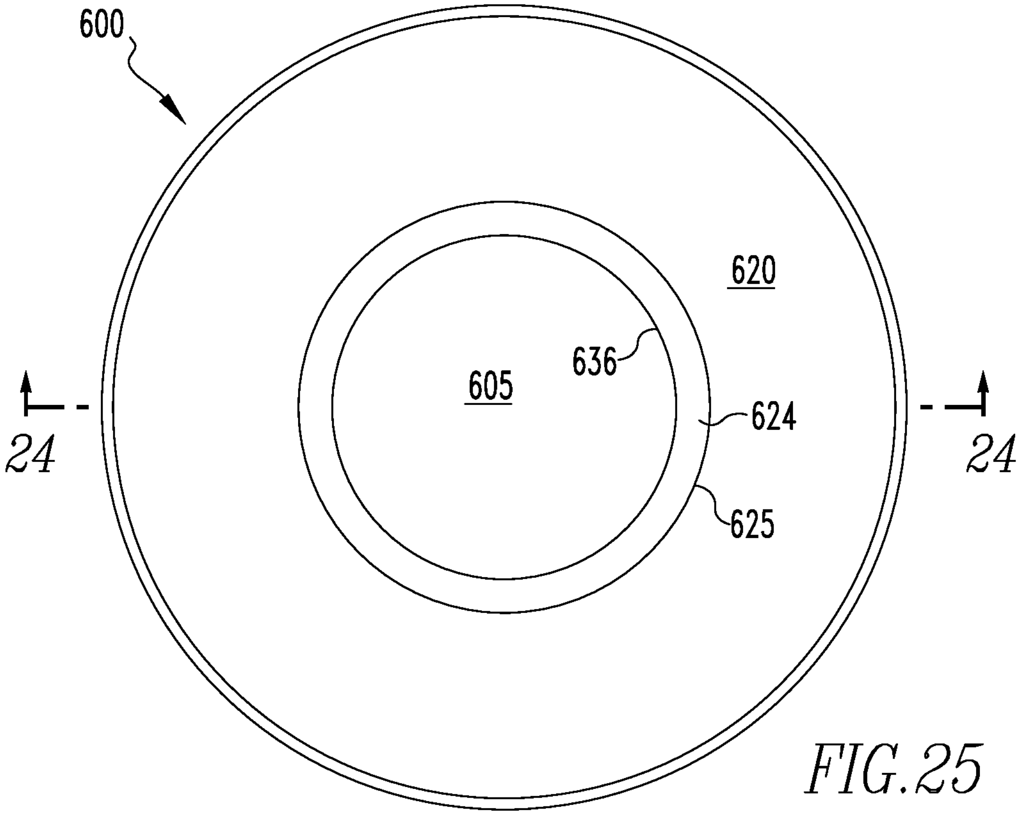
FIG. 25 is a front view of the washer of FIG. 21.
Figure 26:
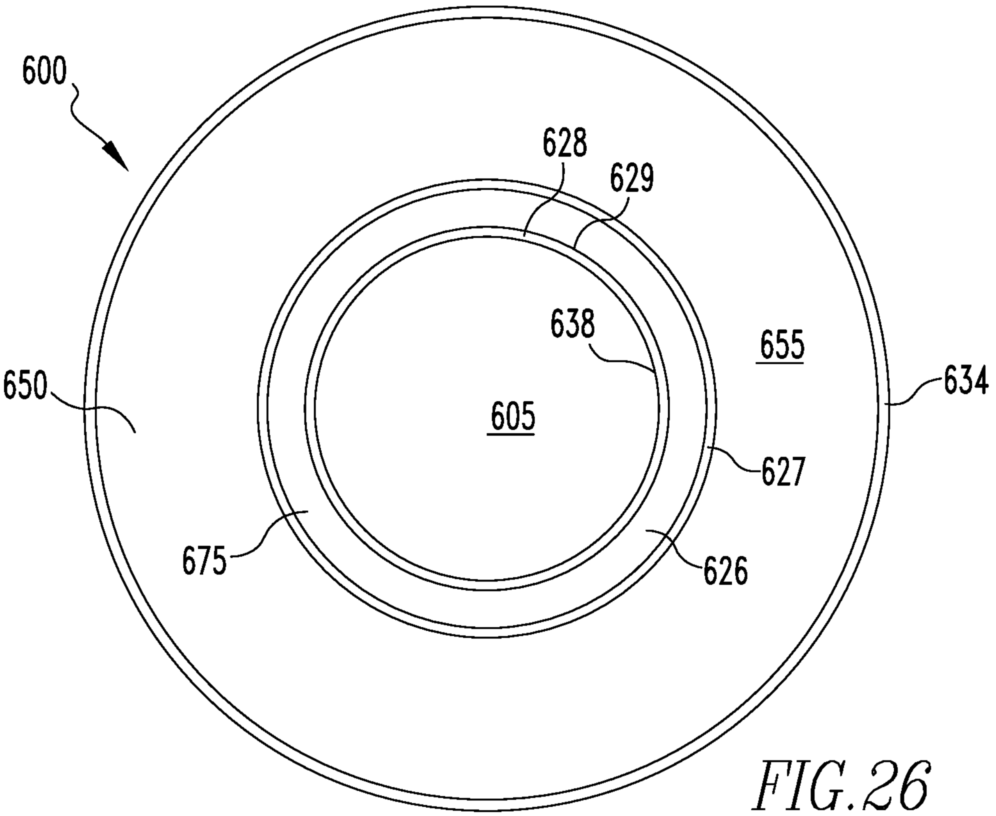
FIG. 26 is a rear view of the washer of FIG. 21.
Figure 27:
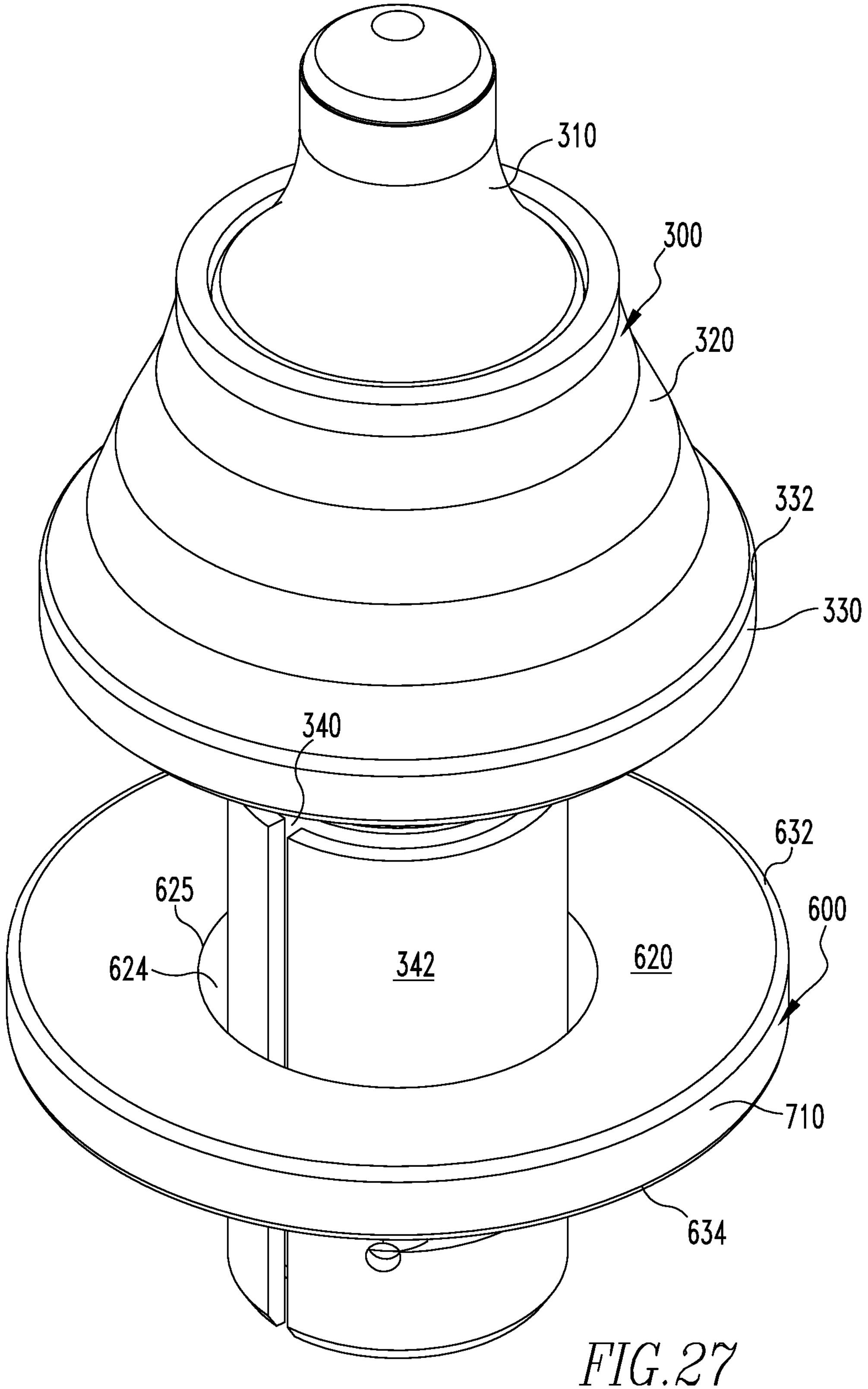
FIG. 27 is an isometric view of a bit and a washer prior to installation on a holder, with the washer at a distance from the bit collar in accordance with an embodiment of the present invention.
Figure 28:
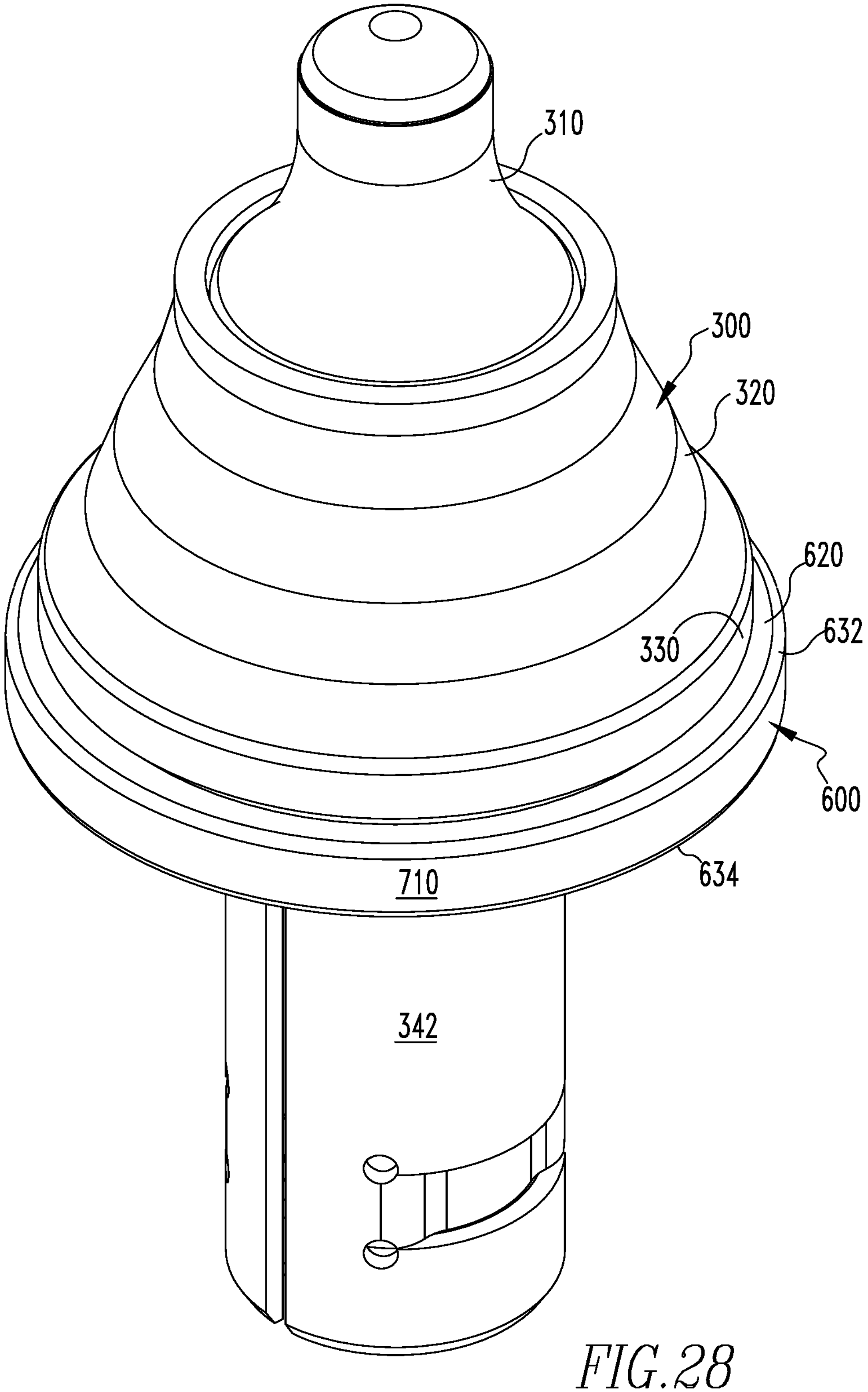
FIG. 28 is an isometric view of the bit and washer of FIG. 27, with the washer against the bit collar in accordance with an embodiment of the present invention.
Figure 29:
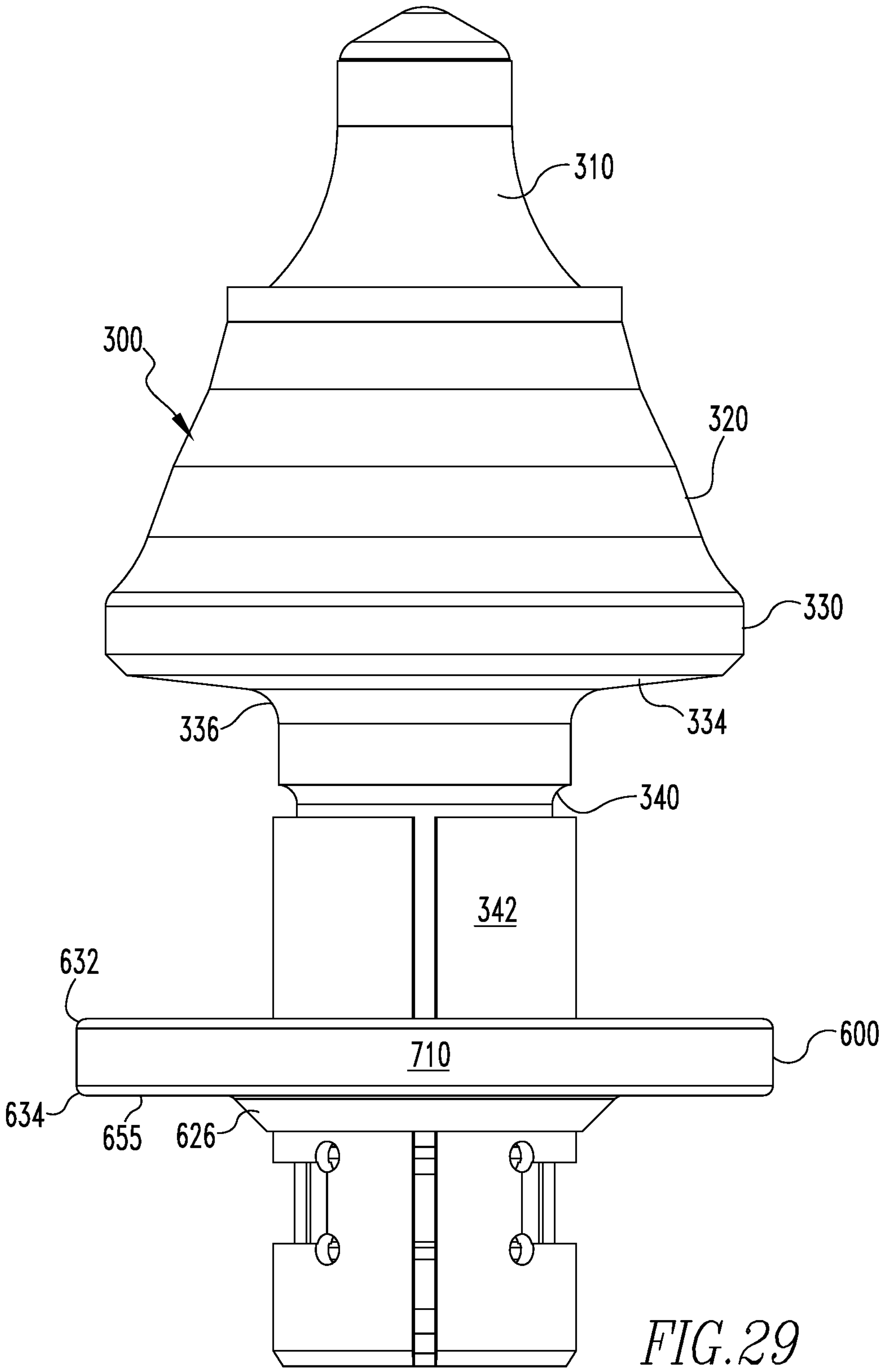
FIG. 29 is a side view of the bit and washer of FIG. 27, with the washer at a distance from the bit collar in accordance with an embodiment of the present invention.
Figure 30:
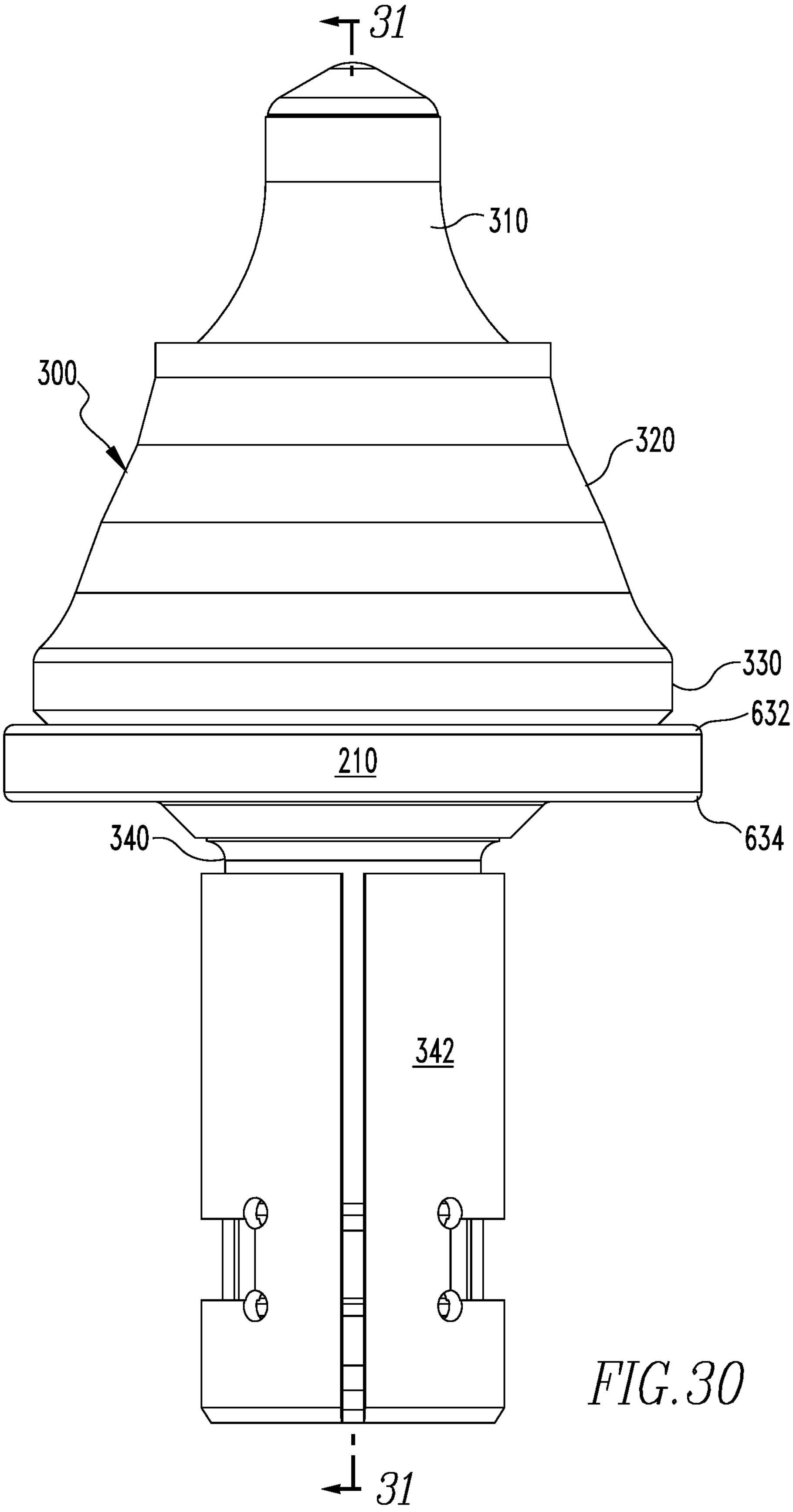
FIG. 30 is a side view of the bit and washer of FIG. 27, with the washer against the bit collar in accordance with an embodiment of the present invention.
Figure 31:
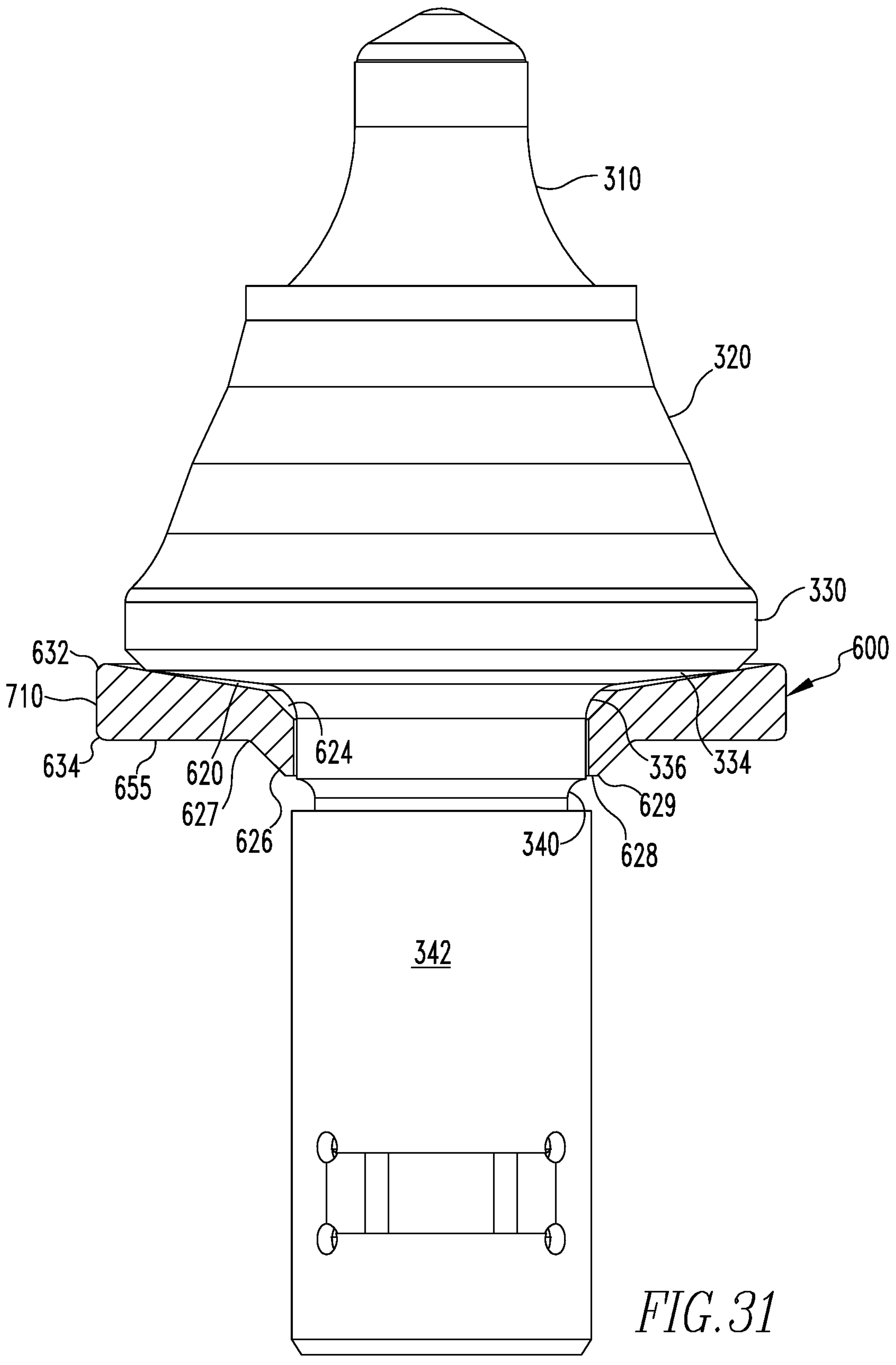
FIG. 31 is a cross-sectional side view taken through section 31-31 of FIG. 30 showing the washer in sectional form.

With continued reference to FIGS. 12-14, the washer 100 may engage with the rotatable bit 300. The bit shank 340 may be inserted through the washer central hole 105 such that the washer front face 110 faces the collar rear surface 334. The washer rearwardly tapered front surface 120 may come in contact with the collar rear surface 334. The washer rearwardly tapered front surface 120 may form a line contact with the collar rear surface 334, or may form a planar contact. The contact between the washer rearwardly tapered front surface 120 and the collar rear surface 334 may become a planar contact or more of a planar contact after wear of the washer rearwardly tapered front surface 120 and/or the collar rear surface 334 during operation of the rotatable bit 300. A planar contact may reduce rotation of the washer 100, resulting in less wear of the washer 100 and holder 500, while also reducing the amount of debris that may pass through the washer 100 into the holder 500.

The washer front planar surface 165 may not come in contact with the rotatable bit 300 when the washer 100 engages with the rotatable bit 300. The contact between the rotatable bit 300 and the washer 100 may not extend beyond the washer tapered front transition edge 121. The washer front planar surface 165 may reduce the amount of debris that may pass through the washer central hole 105 during operation of the rotatable bit 300.

The washer front bevel 124 may align with the bit transition edge 336 when the washer 100 engages with the rotatable bit 300. The bit transition edge 336 may be curved such that the bit transition edge 336 does not come in contact with the washer front bevel 124. During operation of the rotatable bit 300, the bit transition edge 336 and/or the washer front bevel 124 may undergo corrosion and/or wear such that the bit transition edge 336 comes in contact with the washer front bevel 124.

Referring now to FIGS. 1-3, shown is a holder 500. The holder 500 may be structured and arranged to engage the rotatable bit 300. The holder 500 may be cylindrical in shape extending in the longitudinal direction along the longitudinal axis 200. The holder 500 may include a holder central hole 525 centered in the holder 500 extending through the holder 500 along the longitudinal axis 200. The holder central hole 525 forms a holder inner surface 520. The diameter of the holder inner surface 520 may be wider than the outer diameter of the bit shank 340 such that the bit shank 340 can be inserted into the holder central hole 525.

With continued reference to FIGS. 1-3, the holder front surface 510 may be perpendicular or substantially perpendicular to the longitudinal axis 200 and may be located opposite the holder rear surface 530. The holder front surface 510 may be structured and arranged to come in contact with the washer rear surface 155 of a washer 100. The holder front surface 510 may be parallel or substantially parallel to the washer rear surface 155.

The holder front surface 510 may transition into a holder tapered surface 514 and a holder tapered surface transition edge 512. The holder tapered surface 514 may be on an inner portion of the holder 500. The diameter of the holder tapered surface transition edge 512 may be the same or substantially the same as the diameter as the rear bevel edge 127 of the washer 100, or the diameter of the holder tapered surface transition edge 512 may be less than or greater than the diameter of the rear bevel edge 127. The holder tapered surface transition edge 512 may be a rounded edge, a sharp edge, or a chamfered edge.

The holder tapered surface 514 may be tapered at a holder angle $A_H$ from being perpendicular to the longitudinal axis 200. The holder angle $A_H$ may be at least 30° from perpendicular with the longitudinal axis 200, for example, at least 35° or at least 40° from perpendicular with the longitudinal axis 200. The holder angle $A_H$ may be at most 60° from perpendicular with the longitudinal axis 200, for example at most 55° or 50° from perpendicular with the longitudinal axis 200. The holder angle $A_H$ may be exactly or about 45°. The holder angle $A_H$ may be the same or substantially the same as the taper angle $A_T$ of the washer 100. The holder tapered surface 514 may be parallel or substantially parallel with the washer rear tapered surface 126. The holder tapered surface 514 may form a planar and/or linear contact with the washer rear tapered surface 126 when the washer 100 is engaged with the holder 500. A planar or more planar contact may form after wear of one or more surfaces of the washer 100 and/or holder 500 (e.g., the washer rear bevel 126, washer rear surface 155, holder front surface 510, and/or holder tapered surface 514). A planar contact will reduce the amount of rotation experienced by the washer 100 during use by increasing the friction between the washer 100 and the holder 500. Reduction in the rotation of the washer 100 reduces wear of the holder 500, increasing the life of the holder 500.

The washer 100 shown in FIGS. 4-9 can be fabricated by any acceptable means for manufacturing washers. The washer 100 shown in FIGS. 21-26 can also be fabricated by any acceptable means for manufacturing washers.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A rotatable cutting tool comprising a rotatable bit and a washer, wherein:

the rotatable bit comprises:

a bit head including a collar centered on a central longitudinal axis; and a generally cylindrical shank extending rearwardly along the longitudinal axis from a rear of the collar; and the washer comprises:

an annular flange centered around the longitudinal axis comprising an annular flange outer diameter, an annular flange inner diameter, a washer front face, and a washer rear face opposite the washer front face; and a central hole extending through the annular flange centered around the longitudinal axis comprising a central hole outer diameter, wherein the washer rear face comprises a washer rear surface substantially perpendicular to the longitudinal axis, and the washer front face comprises a tapered front surface and a front bevel, wherein the tapered front surface is arranged at a slant angle $A_s$ measured from a direction perpendicular to the longitudinal axis such that the annular flange comprises an inner washer thickness $T_I$, an outer washer thickness $T_O$ radially outward from the inner washer thickness $T_I$, and the outer washer thickness $T_O$ is greater than the inner washer thickness $T_I$.

2. The rotatable cutting tool of claim 1, wherein the washer rear face surface of the washer is within ±3° from being 90° to the longitudinal axis.

3. The rotatable cutting tool of claim 1, wherein the slant angle $A_s$ is at least 1°.

4. The rotatable cutting tool of claim 1, wherein the slant angle $A_s$ is from 2° to 30° and is greater than any deviation of the washer rear face surface from being 90° to the longitudinal axis.

5. The rotatable cutting tool of claim 1, wherein the outer washer thickness $T_O$ is at least 5% greater than the inner washer thickness $T_I$.

6. The rotatable cutting tool of claim 1, wherein the washer front face comprises a planar surface between the annular flange outer diameter and the slanted surface, and the planar surface is perpendicular to the longitudinal axis.

7. The rotatable cutting tool of claim 1, wherein the rear of the collar comprises a collar conical surface tapered at a collar angle $A_C$ radially inward and rearwardly from an outer diameter of the collar.

8. The rotatable cutting tool of claim 7, wherein the slant angle $A_s$ is greater than or equal to the collar angle $A_C$.

9. The rotatable cutting tool of claim 7, wherein the collar angle $A_C$ is from 2° to 30°.

10. A cutting tool washer for use with a cutting tool bit, the washer comprising:

an annular flange centered around the longitudinal axis comprising an annular flange outer diameter, an annular flange inner diameter, a washer front face, and a washer rear face opposite the washer front face; and a central hole extending through the annular flange centered around the longitudinal axis comprising a central hole outer diameter, wherein the washer rear face comprises a washer rear surface substantially perpendicular to the longitudinal axis, and the washer front face comprises a tapered front surface and a front bevel, wherein the tapered front surface is arranged at a slant angle $A_s$ measured from a direction perpendicular to the longitudinal axis such that the annular flange comprises an inner washer thickness $T_I$, an outer washer thickness $T_O$ radially outward from the inner washer thickness $T_I$, and the outer washer thickness $T_O$ is greater than the inner washer thickness $T_I$.

11. The cutting tool washer of claim 10, wherein the washer rear face surface of the washer is within ±3° from being 90° perpendicular to the longitudinal axis.

12. The cutting tool washer of claim 10, wherein the slant angle $A_s$ is at least 1°.

13. The cutting tool washer of claim 10, wherein the slant angle $A_s$ is from 2° to 30° and is greater than any deviation of the washer rear face surface from being 90° perpendicular to the longitudinal axis.

14. The cutting tool washer of claim 10, wherein the outer washer thickness $T_O$ is at least 5% greater than the inner washer thickness $T_I$.

15. The cutting tool washer of claim 10, wherein the outer washer thickness $T_O$ is from 40% to 60% greater than the inner washer thickness $T_I$.

16. The cutting tool washer of claim 10, wherein the washer front face comprises a planar surface between the annular flange outer diameter and the slanted surface, and the planar surface is perpendicular to the longitudinal axis.

17. The cutting tool washer of claim 16, wherein the washer front face comprises a tapered front transition edge between the planar surface and the slanted surface comprising a front transition edge diameter at least 5% less than the annular flange outer diameter.

18. The cutting tool washer of claim 17, wherein the front transition edge diameter is at least 20% greater than the annular flange inner diameter.

* * * * *